United States Patent
Nishimoto et al.

(10) Patent No.: US 7,654,742 B2
(45) Date of Patent: Feb. 2, 2010

(54) HYDRODYNAMIC BEARING DEVICE, MOTOR, RECORDING DISC DRIVING APPARATUS AND ASSEMBLY JIG

(75) Inventors: Youichi Nishimoto, Ehime-ken (JP); Naoshi Kainoh, Ozu (JP); Tsuyoshi Matsumoto, Ozu (JP)

(73) Assignee: Panasonic Corporation, Osaka (JP)

( * ) Notice: Subject to any disclaimer, the term of this patent is extended or adjusted under 35 U.S.C. 154(b) by 895 days.

(21) Appl. No.: 11/312,579

(22) Filed: Dec. 21, 2005

(65) Prior Publication Data

US 2007/0133911 A1 Jun. 14, 2007

(30) Foreign Application Priority Data

Dec. 9, 2005 (JP) .............................. 2005-356935

(51) Int. Cl.
*F16C 33/10* (2006.01)
(52) U.S. Cl. ...................................... 384/107; 384/114

(58) Field of Classification Search .................. 384/107, 384/111, 112, 114, 118, 120
See application file for complete search history.

(56) References Cited

FOREIGN PATENT DOCUMENTS

| JP | 2001-355631 | 12/2001 |
|---|---|---|
| JP | 2002-31131 | 1/2002 |
| JP | 2005-16672 | 1/2005 |

*Primary Examiner*—William C Joyce
(74) *Attorney, Agent, or Firm*—Wenderoth, Lind & Ponack, L.L.P.

(57) ABSTRACT

A hydrodynamic bearing device 4 comprises a shaft 41, a second thrust flange 41c, a sleeve 42, a radial bearing 71, and a thrust bearing 73. The second thrust flange 41c is fixed near one end of the shaft 41. A third cylindrical protrusion 42e that protrudes farther in the axial direction than the second thrust flange is fixed to or integrally machined at one end of the sleeve 42. A notch 50 that communicates between a radial inner space and a radial outer space separated by the third cylindrical protrusion 42e is provided to the third cylindrical protrusion 42e.

19 Claims, 18 Drawing Sheets

HYDRODYNAMIC BEARING DEVICE, MOTOR, RECORDING DISC DRIVING APPARATUS AND ASSEMBLY JIG

TECHNICAL FIELD

The present invention relates to a hydrodynamic bearing device, a motor and a recording disk driving apparatus equipped with this hydrodynamic bearing device, and an assembly jig used in the assembly of a hydrodynamic bearing device or an apparatus equipped with this hydrodynamic bearing device.

BACKGROUND ART

The popularity of video distribution over the Internet has brought with it a need to increase the recording capacity of the servers that serve as information sources for such distribution. To this end, an increase in data distribution speed and recording capacity has been accomplished in server applications by employing a RAID structure. The number of hard disk drives (hereinafter referred to as HDDs) has to be increased to use a RAID structure, so the general practice has been to install a plurality of HDDs in a tower housing. However, since this is limited to the amount of installation space that is available, it is necessary at the same time to increase the recording capacity of each individual HDD. It is therefore important to increase the number of disks installed in a HDD.

Also, it is becoming increasingly common for individual users to record to a HDD rather than a conventional VCR. Here again, users want to be able to record distributed video to a HDD for as long a time as possible, so there is a strong demand for greater recording capacity in HDDs.

In the past, one method for increasing the number of disks that could be installed in a HDD was to fix the top end of a motor shaft with a screw to the cover constituting the HDD housing, and use the rigidity of the shaft to suppress vibration of the housing.

A structure here in which a shaft is fixed at both ends is also called a "tied" structure, and is often used in structures that involve ball bearings.

Meanwhile, there has been a sharp increase in the planar recording density of HDDs, and particularly the track density, and it has been difficult to keep NRRO (Non-Repetitive Run Out) to 100 nm or less with conventional ball bearings, and from the standpoint of noise and impact resistance as well, ball bearings are gradually being replaced by hydrodynamic bearings.

However, a hydrodynamic bearing needs to be designed so as to suppress leakage or evaporation of the lubricant (lubricating oil). In particular, with a hydrodynamic bearing having a tied structure, in which both ends are open, more structural modification is necessary than with an untied structure, which has a pouch-like oil reservoir. More specifically, there is greater importance in the seal structure at openings where the liquid surface is exposed to the air.

There have been many proposals for the seal structures of hydrodynamic bearings, and particularly the constitution near the outer ends thereof (see, for example, Patent Documents 1 to 3).

In all of Patent Documents 1 to 3, the constitution is a spindle motor for a HDD, in which a shaft is fixed to a base or chassis. A sleeve is rotatably provided around the shaft. Radial dynamic pressure generation grooves are formed in a herringbone pattern at two vertical levels in the axial direction around the inner peripheral cylindrical face of the sleeve, and the sleeve pairs with the shaft to constitute a radial bearing.

Also, thrust flanges that are fixed to the shaft are provided at above and below positions in the axial direction of the radial bearing. The thrust flanges are disposed across from the ends of the axial end faces of the sleeve. Thrust dynamic pressure generation grooves are formed in a spiral or herringbone pattern on the sleeve-side end faces of the thrust flanges, and constitute thrust bearings between the thrust flanges and the sleeve.

A lubricant continuously fills the space between the radial bearing and the thrust bearings. Openings those expose the liquid surfaces of the lubricant to the atmosphere are provided at vertical positions in the axial direction of two thrust bearings, and seal structures are formed in the openings. These seal structures prevent the lubricant from leaking out while the hydrodynamic bearing is stopped, rotating, in shipment, or being installed in an instrument.

Also, a thrust vertical communication hole is provided at a radial position of the sleeve across from the outer peripheral edges of the thrust flanges in the axial direction, so as to communicate with the vertical thrust bearings in the axial direction. This thrust vertical communication hole is also filled with lubricant. The effect of this thrust vertical communication hole is that when there is variance in the assembly precision or machining precision of the thrust bearings or the radial bearing, even if the pumping force of the each bearing (a force that tries to push the lubricant in one direction) should be non-uniform, the pressure will be substantially the same as atmospheric pressure because the thrust vertical communication hole is near the opening of the bearing. This makes it possible to equalize the pressure differential between the bearings, which means that the lubricant will be less likely to leak during rotation.

Further, female threads are formed at one end of the shaft, and the HDD cover is fixed to the shaft with female threads. With a constitution such as this, the HDD cover and the lower chassis are securely fixed via the shaft. As a result, the rigidity of the overall housing is greatly increased, resistance to vibration and shock is improved, and there is less chassis vibration, which is caused by motor vibration that occurs during motor rotation. Accordingly, there is less transmission of harmful vibration to a voice coil motor (VCM) to which the recording and reproduction head is mounted, which affords higher-density recording. Furthermore, even if there is an increase in the number of disks, which account for the majority of the rotor weight, it will be possible to reduce the rocking mode frequency component attributable to the bearings. As a result, many more disks can be accommodated than with a single-ended motor in which the motor shaft is supported at just one end, and the overall recording capacity of the HDD can also be increased by several multiples.

Patent Documents 1 to 3 disclose a peripheral wall that is either fixed or integrally machined in the sleeve or hub. This will be described through reference to FIG. 18.

A peripheral wall 302 is integrally formed on the axial upper side (the upper and lower directions in the drawing are referred to as the axial upper side and axial lower side) of a sleeve 300. As shown in FIG. 18, the peripheral wall 302 is provided in order to facilitate the centering of a clamping member 306 for clamping a disk 304 during the fixing of the clamping member 306 to the outer periphery of a hub 308 fixed to the outer peripheral side of the sleeve 300. With the structure disclosed in Patent Document 2, the distal end of the shaft is formed lower than the distal end of the peripheral wall. This is because the thickness of the HDD is determined by de facto standard, so the female threads must not protrude past the HDD cover when the HDD cover is fixed with female threads.

The peripheral wall is constituted so as to cover the vertical (axial direction) seal structure from the outer peripheral side. The peripheral wall thus serves as a barrier that prevents any jig or a worker from accidentally coming into contact with the seal structure in the course of assembly.

With the constitution given in Patent Documents 1 to 3, the hydrodynamic bearing is open at both ends, which makes the lubricant sealing performance at both ends especially important. In particular, the lubricant must not leak from either open end even if the hydrodynamic bearing device should be subjected to turbulent vibration, impact, or the like, or if the orientation of the device should change, whether in the completed state of the hydrodynamic bearing device, the completed state of the motor equipped with the hydrodynamic bearing device, or the completed state of the drive equipped with that motor. To that end, it is necessary to achieve good precision in the shape of the seal structure, the structure of the bearings, the dimensional tolerances, and so forth, and to equalize the pressure within the bearing at the top and bottom with the above-mentioned thrust vertical communication hole.

Up until the cover is in place and the HDD is complete, there is generally nothing that serves as a protective cover from the top side (the cover side) of the hydrodynamic bearing device. Consequently, there is the possibility that this side will come into contact with a jig or a finger through the opening on the cover side. This generally occurs, for example, when a person's finger touches the hydrodynamic bearing device in the course of visually inspecting the motor or the hydrodynamic bearing device.

For instance, as shown in FIG. 19, if a person's finger Fg1 touches and applies even just a little more force (see the finger Fg2) so as to block off the peripheral wall 302 of the sleeve 300, the air near the opening 310 will be compressed and apply pressure to the lubricant liquid surface.

Usually, the surface level of the lubricant in a hydrodynamic bearing device is located in the middle (axial direction) of the tapered opening 310 (see L1 in the drawing). In a state in which force is applied to a finger blocking off the peripheral wall 302, the volume of the space located to the inside (radial direction) of the peripheral wall 302 is reduced by the volume indicated by S1, and the liquid level is lowered at the opening 310 by an amount corresponding to this reduction (see L2). As a result, there is the possibility that the liquid level at the other tapered opening in the axial direction will move closer to the open end side through the thrust vertical communication hole 312, eventually causing the lubricant to overflow from the opening 314. Leakage of the lubricant from the other opening 314 is particularly apt to occur when the peripheral wall 302 is blocked off very suddenly. This is because the concussive application of pressure to the lubricant surface makes it impossible for the surface tension alone at the tapered opening 314 to withstand both the pressure that is transmitted through the lubricant and the lubricant weight.

It can be confirmed by visual inspection whether the lubricant has leaked before the hydrodynamic bearing device is installed in the motor. In this case, it is a relatively simple matter to remove from the assembly line any products that do not pass inspection because of lubricant leakage. However, once the hydrodynamic bearing device has been installed in the motor, or when that motor has been installed in a HDD, it is difficult to tell whether the lubricant has leaked.

When the peripheral wall 302 (see FIG. 19) is blocked off more gradually, there is no concussive pressure fluctuation, so the lubricant can be retained in the tapered opening 314. Nevertheless, even if the lubricant does not leak from the opening 314, if the lubricant is pushed down at the opening 310, this allows air bubbles to get into the thrust bearing 316 on the axial upper side, which communicates with the opening 310. When this happens, if the hydrodynamic bearing device starts rotating while these bubbles are admixed, there may be lubricant breakdown in the thrust bearing or radial bearing, which can lead to motor lock within a short time. The admixture of bubbles in the thrust bearing or radial bearing is difficult to ascertain by visual inspection, so the infiltration of these bubbles must be prevented.

Patent Document 1: Japanese Laid-Open Patent Application 2001-355631

Patent Document 2: Japanese Laid-Open Patent Application 2002-311131

Patent Document 3: Japanese Laid-Open Patent Application 2005-16672

Figure 1:
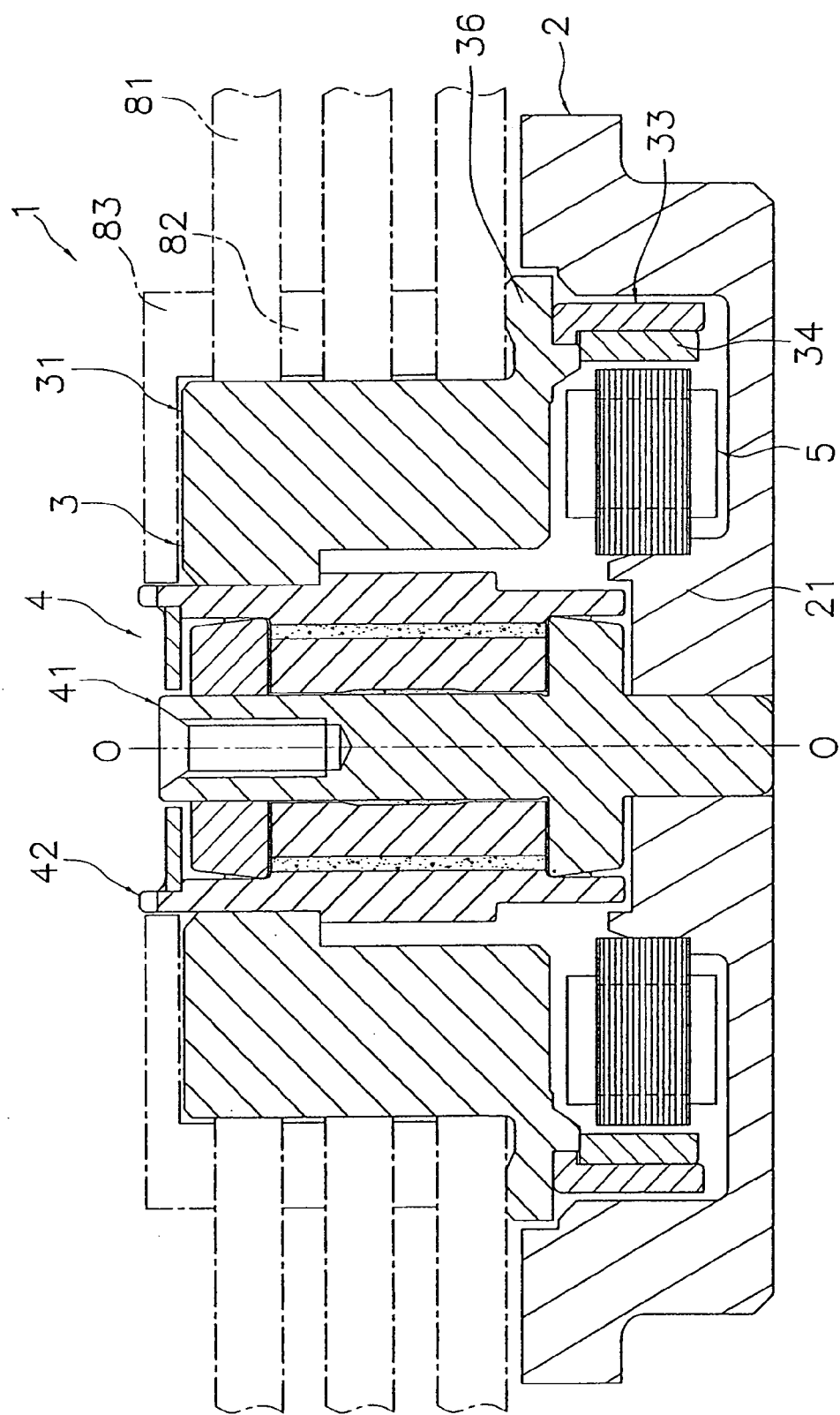
FIG. 1 is a cross section of a spindle motor in a first embodiment of the present invention.

KEY 4 hydrodynamic bearing device
41 shaft
41c second thrust flange
42 sleeve
42e third cylindrical protrusion
50 notch
71 radial bearing
73 thrust bearing

DISCLOSURE OF THE INVENTION

Problems which the Invention is Intended to Solve

It is an object of the present invention to prevent the lubricant that fills a bearing from leaking out, and prevent air bubbles from infiltrating the bearing, even if the open end of a bearing should be blocked off by a finger or the like due to a work accident or the like in the course of assembling a hydrodynamic bearing device, or in the course of attaching this hydrodynamic bearing device to a motor, or in the course of attaching this motor to a HDD.

Means Used to Solve the Above-Mentioned Problems

The hydrodynamic bearing device of the present invention comprises a shaft, a sleeve, a bearing component, and a bearing seal. The sleeve is attached so as to be capable of relative rotation with respect to the shaft. The bearing component includes a lubricant that fills the space between the shaft and the sleeve, and a dynamic pressure generation groove that is formed around the outer peripheral face of the shaft or the inner peripheral face of the sleeve and that supports the sleeve rotatably with respect to the shaft. The bearing seal is constituted between the sleeve and the shaft, is provided near the two axial ends of the shaft, and seals the lubricant in the bearing component. An annular protrusion that protrudes farther in the axial direction than the bearing seal is fixed to or integrally machined on at least one end of the sleeve. A communication mechanism is provided to the annular protrusion, for communicating between the radial outer space and the radial inner space that are separated by the annular protrusion.

With the hydrodynamic bearing device of the present invention, even if the annular protrusion should be blocked off at one end when a worker touches the annular protrusion, the inner and outer spaces of the annular protrusion will still communicate with each other through the communication mechanism. Accordingly, even if one end of the annular protrusion should be blocked off and pressure applied to the inner space, that pressure will not be transmitted to the gap between the sleeve and the shaft that communicates with the inner space, or to the lubricant that fills this gap. It is thus possible to prevent the lubricant from leaking, or air bubbles from getting into the bearing component, which would otherwise occur when pressure was applied to the open end of the bearing component.

EFFECT OF THE INVENTION

With the present invention, it is possible to prevent the lubricant that fills the bearings from leaking out, and prevent air bubbles from infiltrating the bearings, even if the open end of a bearing should be blocked off by a finger or the like due to a work accident or the like in the course of assembling a hydrodynamic bearing device, or in the course of attaching this hydrodynamic bearing device to a motor, or in the course of attaching this motor to a HDD.

BEST MODE FOR CARRYING OUT THE INVENTION

Embodiments of the present invention will be described through reference to the drawings.

First Embodiment

(1) Summary

A first embodiment of the present invention will now be described through reference to FIGS. 1 to 3. The spindle motor that constitutes this first embodiment is equipped with a hydrodynamic bearing device of the type in which the shaft is fixed and the device is open at both ends. This hydrodynamic bearing device is characterized in that a communication mechanism for communicating between the radial inner space and outer space of the sleeve is provided at one end of the sleeve. This will be described in more detail in "(4) Communication Mechanism."

(2) Spindle Motor Configuration

FIG. 1 is a simplified vertical cross section of a spindle motor 1 in the first embodiment of the present invention. O-O in FIG. 1 is the rotational axis of the spindle motor 1. For the sake of convenience, the up and down directions in the drawings will be referred to as the "axial upper side," "axial lower side," and so forth in the description of this embodiment, but the actual attachment state of the spindle motor 1 is not limited to these.

The spindle motor 1 primarily comprises a base plate 2, a stator 5, a hydrodynamic bearing device 4, and a rotor 3. Each of these components will be described in detail below.

The base plate 2 constitutes the stationary portion of the spindle motor 1, and is fixed, for example, to the housing (not shown) of a recording disk apparatus. The base plate 2 has a cylindrical portion 21, and one end of a shaft 41 of the hydrodynamic bearing device 4 (discussed below) is fixed to the inner peripheral side of the cylindrical portion 21. The stator 5 constitutes a magnetic circuit with a yoke 33 and a rotor magnet 34 (discussed below), and is fixed to the outer peripheral side of the cylindrical portion 21.

The rotor 3 constitutes a member on the rotating side of the spindle motor 1, and is the portion that is rotationally driven by the rotational force generated by the magnetic circuit. More specifically, the rotor 3 has a rotor hub 31 made of a nonmagnetic material, a yoke 33 made of a magnetic material, and a rotor magnetic 34. The rotor hub 31 is the member on which a plurality of recording disks 81 are mounted, and is fixed by adhesive bonding or the like to the outer peripheral side of a sleeve 42 (discussed below). The recording disks 81 are, for example, magnetic disks with which information can be recorded and reproduced by information access means (not shown). The recording disks 81 have spacers 82 disposed between them to keep the recording disks 81 a specific distance apart. The recording disks 81 and the spacers 82 are clamped and fixed between a disk holder 36 and a clamper 83 fixed to the rotor hub 31. The yoke 33 is an annular member provided on the axial lower side of the rotor hub 31. The rotor magnet 34 is an annular member disposed so as to face in the radial direction the outer peripheral side of the stator 5, and is fixed to the inner peripheral side of the yoke 33. The stator 5, the yoke 33, and the rotor magnet 34 constitute a magnetic circuit that rotationally drives the rotor 3. The rotor 3 is rotationally driven with respect to the base plate 2 and the stator 5 by the drive force in the rotation direction generated by this magnetic circuit.

(3) Hydrodynamic Bearing Device Configuration

The hydrodynamic bearing device 4 will be described through reference to FIG. 2. FIG. 2 is a simplified vertical cross section of the hydrodynamic bearing device 4. The hydrodynamic bearing device 4 rotatably supports the rotor 3 with respect to the base plate 2, and has the sleeve 42 and the shaft 41.

The sleeve 42 is a member on the rotating side of the hydrodynamic bearing device 4, and is a cylindrical member disposed so as to be capable of relative rotation with respect to the shaft 41 (discussed below). More specifically, as shown in FIG. 2, the sleeve 42 has a sleeve main component 42a, a plurality of first dynamic pressure generation grooves 71a and 71b, a recess 42b, a first cylindrical protrusion 42c, a second cylindrical protrusion 42d, a third cylindrical protrusion 42e, and a plurality of thrust vertical communication holes 42f.

The sleeve main component 42a is a cylindrical portion that constitutes the main part of the sleeve 42. The first dynamic pressure generation grooves 71a and 71b are grooves disposed uniformly in the peripheral direction and formed in the inner peripheral face of the sleeve main component 42a, and have a herringbone shape, for example. The recess 42b is an annular, concave portion formed on the inner peripheral side of the sleeve main component 42a, and is disposed in the axial direction between the first dynamic pressure generation grooves 71a and 71b.

The first and second cylindrical protrusions 42c and 42d are cylindrical portions that protrude in the axial direction from the outer peripheral parts at both ends of the sleeve main component 42a. First and second thrust flanges 41b and 41c (discussed below) are disposed on the inner peripheral side of the first and second cylindrical protrusions 42c and 42d, and therefore the inside diameter of the first and second cylindrical protrusions 42c and 42d is set to be greater than the inside diameter of the sleeve main component 42a. The third cylindrical protrusion 42e is a cylindrical portion that protrudes farther upward in the axial direction from the end of the second cylindrical protrusion 42d, and a cover 45 is fixed by adhesive bonding or the like to the inner peripheral side of the third cylindrical protrusion 42e. The thrust vertical communication holes 42f pass through the sleeve main component 42a in the axial direction, and are disposed uniformly in the peripheral direction, for example.

A notch 50 is formed in at least one place in the peripheral direction at the top end (in the axial direction) of the third cylindrical protrusion 42e. The notch 50 serves as a communication mechanism for communicating between the radial inner space and radial outer space separated by the third cylindrical protrusion 42e. This will be described in further detail in "(4) Communication Mechanism."

The shaft 41 is a member on the stationary side of the hydrodynamic bearing device 4, and its end on the axial lower side is fixed to the cylindrical portion 21 of the base plate 2. The shaft 41 has a shaft main component 41a, a first thrust flange 41b, and a second thrust flange 41c. The shaft main component 41a is a solid cylindrical member that constitutes the main part of the shaft 41, and is disposed on the inner peripheral side of the sleeve main component 42a with a tiny gap therebetween. The first thrust flange 41b is an annular portion formed integrally with the shaft main component 41a, for example, and is disposed on the inner peripheral side of the first cylindrical protrusion 42c so as to be across from the end face on the axial lower side of the sleeve main component 42a with a tiny gap therebetween. The second thrust flange 41c is an annular member disposed on the opposite side of the sleeve main component 42a from that of the first thrust flange 41b (in the axial direction), and is fixed by adhesive bonding, welding or the like to the shaft main component 41a, for example. The second thrust flange 41c is disposed on the inner peripheral side of the second cylindrical protrusion 42d so as to be across from the top face (in the axial direction) of the sleeve main component 42a with a tiny gap therebetween (in the axial direction). The first and second thrust flanges 41b and 41c have second and third dynamic pressure generation grooves 72a and 73a formed on the side across from the end face of the sleeve main component 42a. The second and third dynamic pressure generation grooves 72a and 73a have a spiral or herringbone shape, for example. The second and third dynamic pressure generation grooves 72a and 73a may be provided to the sleeve main component 42a side.

The outer peripheral parts of the first and second thrust flanges 41b and 41c have a tapered shape. More specifically, the outer peripheral faces of the first and second thrust flanges 41b and 41c slant away from the inner peripheral faces of the first and second cylindrical protrusions 42c and 42d, toward the axial lower side and axial upper side. Also, the space between the sleeve 42 and the shaft 41 is filled with a lubricant 46 (serving as a working fluid). Taper seals 48a and 48b are formed between the first thrust flange 41b and the first cylindrical protrusion 42c and between the second thrust flange 41c and the second cylindrical protrusion 42d. Thus, the hydrodynamic bearing device 4 shown in FIG. 2 is a double-open-ended type of hydrodynamic bearing device in which both ends of the sleeve 42 are open. Also, this hydrodynamic bearing device 4 is a fixed-shaft type of hydrodynamic bearing device in which the shaft 41 is fixed.

With this hydrodynamic bearing device 4, a radial bearing 71 that supports the rotor 3 in the radial direction is constituted by the sleeve 42 and its first dynamic pressure generation grooves 71a and 71b, the shaft 41, and the lubricant 46 that fills the space between the shaft 41 and the sleeve 42. A first thrust bearing 72 that supports the rotor 3 in the axial direction is constituted by the first thrust flange 41b and its second dynamic pressure generation groove 72a, the sleeve 42, and the lubricant 46 that fills the space between the sleeve 42 and the first thrust flange 41b. Further, a second thrust bearing 73 that supports the rotor 3 in the axial direction is constituted by the second thrust flange 41c and its third dynamic pressure generation groove 73a, the sleeve 42, and the lubricant 46 that fills the space between the sleeve 42 and the second thrust flange 41c. The relative rotation of these members generates supporting force in the radial and axial directions of the shaft 41 at the bearings 71, 72, and 73.

As discussed above, with this spindle motor 1, the rotor 3 is supported by the hydrodynamic bearing device 4 so as to be capable of relative rotation with respect to the base plate 2 and the stator 5, and when power is sent to the stator 5, the recording disks 81 are rotationally driven along with the rotor 3.

(4) Communication Mechanism

As discussed above, a notch 50 is formed in at least one place in the peripheral direction at the top end (in the axial direction) of the third cylindrical protrusion 42e. The notch 50 communicates between the radial inner space and radial outer space separated by the third cylindrical protrusion 42e, and is open on the axial upper side of the third cylindrical protrusion 42e.

Figure 3:
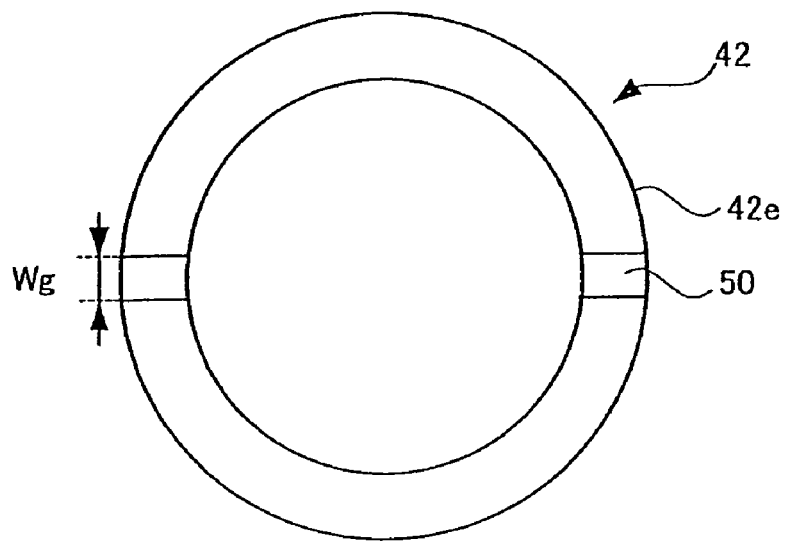
FIG. 3 is a plan view (in the axial direction) of a sleeve.

FIG. 3 is a plan view of the third cylindrical protrusion 42e from the axial upper side. The notch 50 is formed in at least one place on the third cylindrical protrusion 42e, and when dynamic balance during the rotation of the sleeve 42 is taken into account, notches are preferably formed at two or more places (two places in FIG. 3), disposed uniformly in the peripheral direction. The notches 50 are formed so that their cross section perpendicular to the radial direction is rectangular.

The width Wg of these notches 50 in the direction perpendicular to the radial direction is no more than 3 mm. The width Wg is not limited to this, however, and may be 2 mm or less, and preferably 1.5 mm or less, and may be a width such that when the third cylindrical protrusion 42e is blocked off by a finger, for example, the notches 50 will not be blocked off when the finger is pressed toward the axial lower side.

Figure 2:
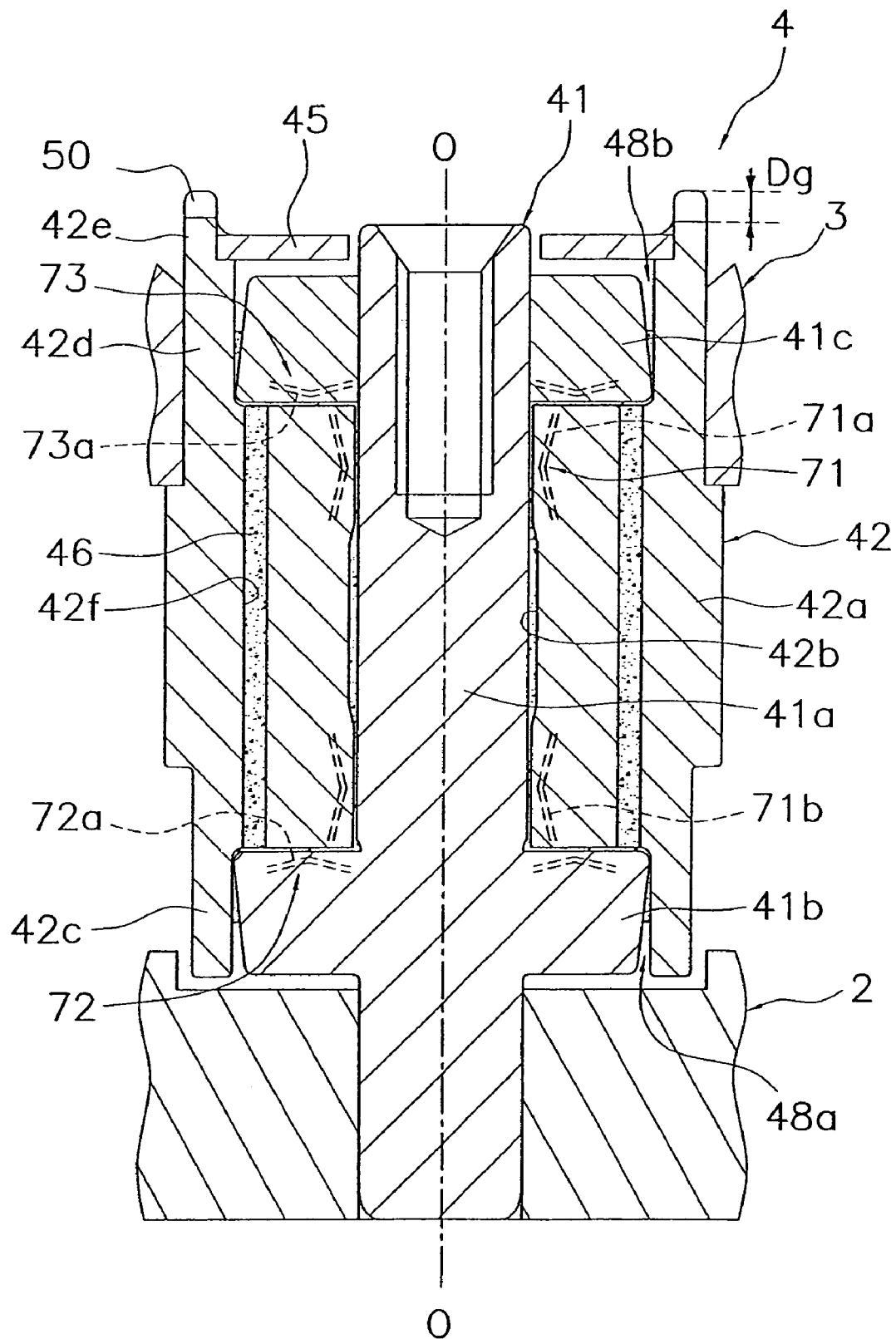
FIG. 2 is a cross section of hydrodynamic bearing device.

As shown in FIG. 2, the depth Dg of the notches 50 in the axial direction (the axial direction dimension from the top face (in the axial direction) of the third cylindrical protrusion 42e to the bottom of the notches 50) is at least 0.1 mm. The depth Dg is not limited to this, however, and may be at least 0.15 mm, and preferably at least 0.2 mm, and may be a depth such that when the third cylindrical protrusion 42e is blocked off by a finger, for example, the notches 50 will not be blocked off when the finger is pressed toward the axial lower side.

The axial depth Dg and width Wg may be values that satisfy the relationship Wg/Dg≦20.

(5) Effect of the First Embodiment

With the hydrodynamic bearing device 4, notches 50 are formed that communicate with the radial inner space and radial outer space separated by the third cylindrical protrusion 42e. Accordingly, even if the third cylindrical protrusion 42e should be blocked off by a finger or the like so that the inner space is pressurized, this pressure will not be transmitted through the taper seal 48b (communicating with the inner space) to the lubricant 46. Thus, it is possible to prevent the lubricant 46 from leaking out from the taper seal 48a on the axial lower side, which communicates with the taper seal 48b through the lubricant 46, and to prevent the interface position of the taper seal 48b from being pushed down to the axial lower side face of the second thrust flange 41c so that air bubbles get into the second thrust bearing 73.

Also, because the values of the axial depth Dg and width Wg of the notches 50 are set as above, and the relationship between the axial depth Dg and width Wg is set as above, even if the third cylindrical protrusion 42e is blocked off with a finger or the like and pressed on with considerable strength, this will not hinder communication through the notches 50 in the radial direction. Thus, the same effect as above is further ensured.

(6) Modifications of the First Embodiment

Modifications of the first embodiment will now be described. Those members that are the same as above will be numbered the same as above, and will not be described again.

(6-1)

In the above embodiment, providing the notches 50 to the third cylindrical protrusion 42e was described as the communication mechanism for communicating between the radial inner space and radial outer space separated by the third cylindrical protrusion 42e, but the configuration of the communication mechanism is not limited to this.

Figure 4:
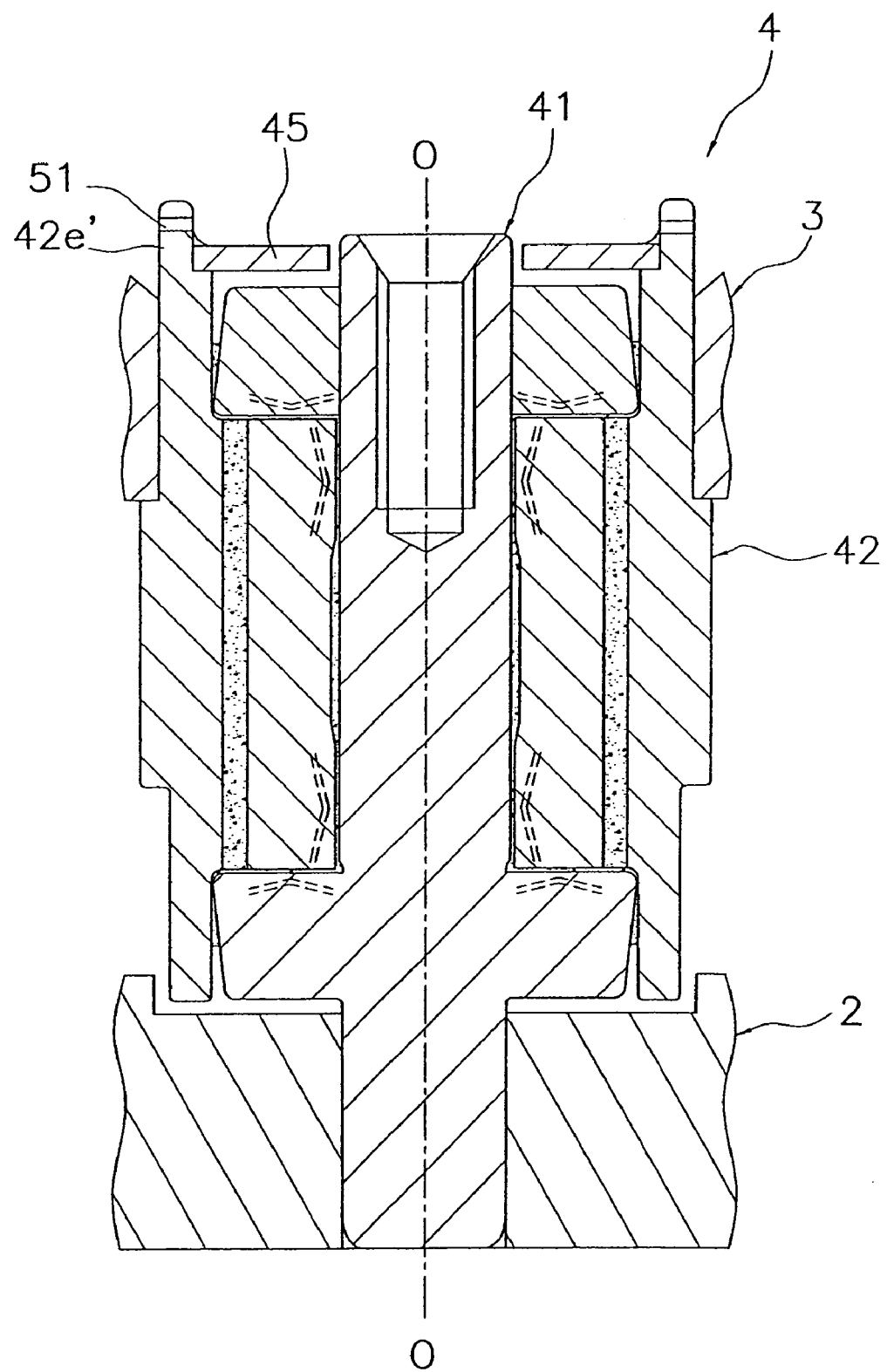
FIG. 4 is a cross section of a hydrodynamic bearing device in a modification.

For instance, as shown in FIG. 4, communication between the radial inner space and radial outer space of a third cylindrical protrusion 42e' may be accomplished by forming a communication hole 51, which extends radially, in at least one place in the peripheral direction of the third cylindrical protrusion 42e', and preferably in two or more places distributed uniformly in the peripheral direction.

The communication hole 51 is formed in the third cylindrical protrusion 42e' by drilling or electric discharge machining, and has a diameter of at least 0.1 mm. When the communication hole 51 is formed in a plurality of places in the peripheral direction, the diameter of each of the communication holes 51 may be determined so that the total cross sectional area of all the communication holes 51 is not over the surface area of a circle with a diameter of 0.1 mm.

A case in which the cross sectional shape of the communication hole 51 was circular was described here, but the cross sectional shape may be rectangular or some other polyhedral shape, in which case again, the size of each of the communication holes 51 may be determined so that the total cross sectional area of the communication holes 51 is not over the surface area of a circle with a diameter of 0.1 mm.

Also, forming the communication hole 51 by drilling or electric discharge machining was described here, but the communication hole 51 may instead be formed by another method. For instance, an annular member in which a notch has been formed in the radial direction may be fixed on the axial upper side of the third cylindrical protrusion 42e', and the communication hole 51 may be formed by the notch in the annular member and the top face (in the axial direction) of the third cylindrical protrusion 42e'.

(6-2)

In the above embodiment and (6-1), the communication mechanism was described as being formed in the radial direction, but the direction in which the communication mechanism is formed is not limited to this, and the formation may be in any direction so long as it affords communication between the inner space and outer space of the third cylindrical protrusion 42e.

Figure 5:
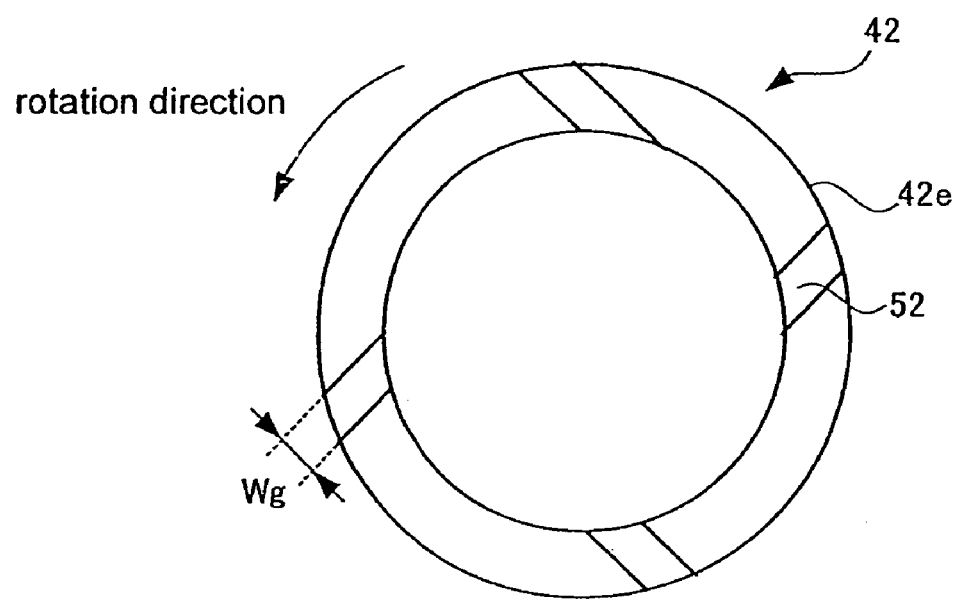
FIG. 5 is a plan view (in the axial direction) of a sleeve in a modification.

For instance, as shown in FIG. 5, a notch 52 may be formed so that it slants in the rotation direction of the sleeve 42 toward the outside in the radial direction. In this case, of the dimensions of the notch 52, the width Wg is the width in the direction perpendicular to the direction along the notch 52, and the value thereof is determined in the same manner as in the above embodiment.

If the notch 52 is formed in a substantially spiral shape as shown in FIG. 5, then even if droplets of the lubricant 46 should be flung all the way to the notch 52, there will be a force in the inside of the notch 52 that returns the droplets to the inside (in the radial direction) during the rotation of the sleeve 42. Accordingly, the lubricant 46 can be effectively prevented from leaking out of the notch 52 to the outside in the radial direction, and the lubricant 46 can be prevented from fouling the recording disks 81.

(6-3)

In the above embodiment, the cross sectional shape of the notch 50 was described as being rectangular, but the cross sectional shape of the notch 50 is not limited to this, and may be any shape. The "cross section" referred to here is a section in the direction perpendicular to the direction along the notch 50.

Figure 6A:
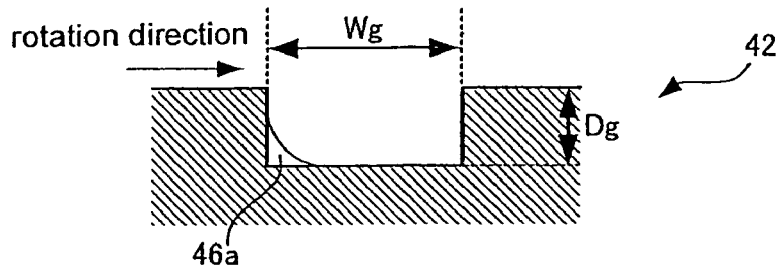
FIG. 6 is a cross section of a communication mechanism in a modification.
Figure 6B:
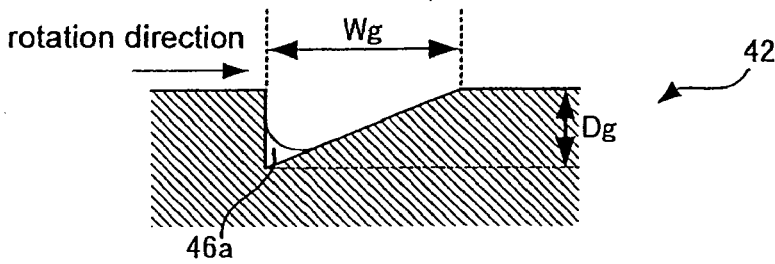
Figure 6C:
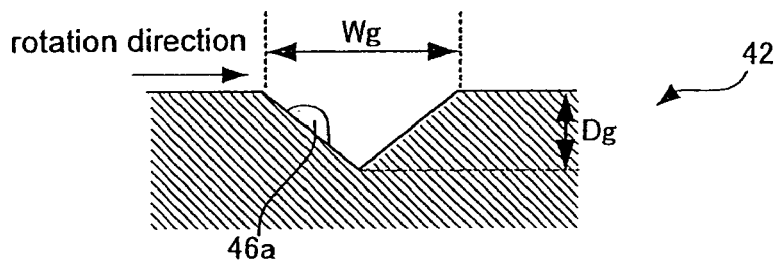
Figure 6D:
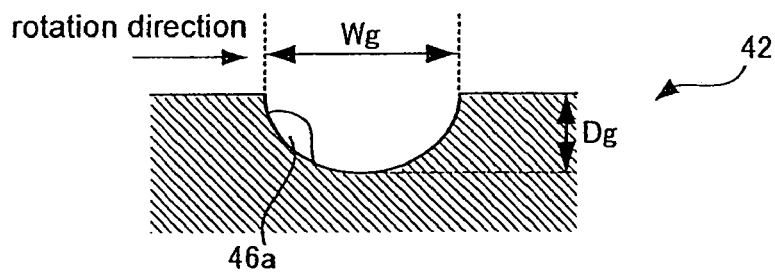
Figure 6E:
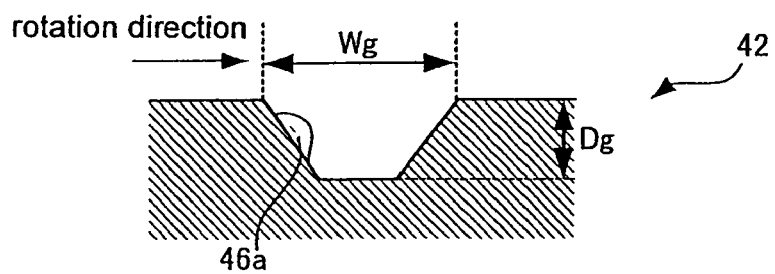

For instance, the cross sectional shapes shown in FIGS. 6a to 6e may be used. FIG. 6a is the cross sectional shape of the notch 50 described in the above embodiment, which is rectangular. In FIG. 6b, the notch is formed with a right triangular cross sectional shape, and has to the outside in the sleeve rotation direction a vertical face that extends from the top face (in the axial direction) of the third cylindrical protrusion 42e to the axial lower side. In FIG. 6c, the notch has a triangular cross sectional shape. In FIG. 6d, the notch has a semicircular cross sectional shape. In FIG. 6e, the notch has a trapezoidal cross sectional shape.

The width Wg and depth Dg of each of these notches are the dimensions of the portions shown in FIGS. 6a to 6e, and the values thereof are determined in the same manner as in the above embodiment.

FIGS. 6a to 6e show the positions where the droplets 46a of lubricant 46 flung into the notch will collect during the rotation of the sleeve 42.

When the notch is provided in the substantially spiral shape described in (6-2), it preferably has the cross sectional shape shown in FIG. 6a or 6b, in which case the droplets 46a will be pushed back to the inside (in the radial direction) more effectively by the effect of this spiral shape.

When the notch is linear in the radial direction, its cross sectional shape is preferably that shown in FIG. 6c or 6e when the occurrence of burrs and so forth (discussed in (6-7)) is taken into account.

(6-4)

A case in which the top end (in the axial direction) position of the shaft 41 was lower than the top end (in the axial direction) position of the third cylindrical protrusion 42e was described in the above embodiment, but the effect of the present invention is not limited to a hydrodynamic bearing device 4 of this structure.

Figure 7:
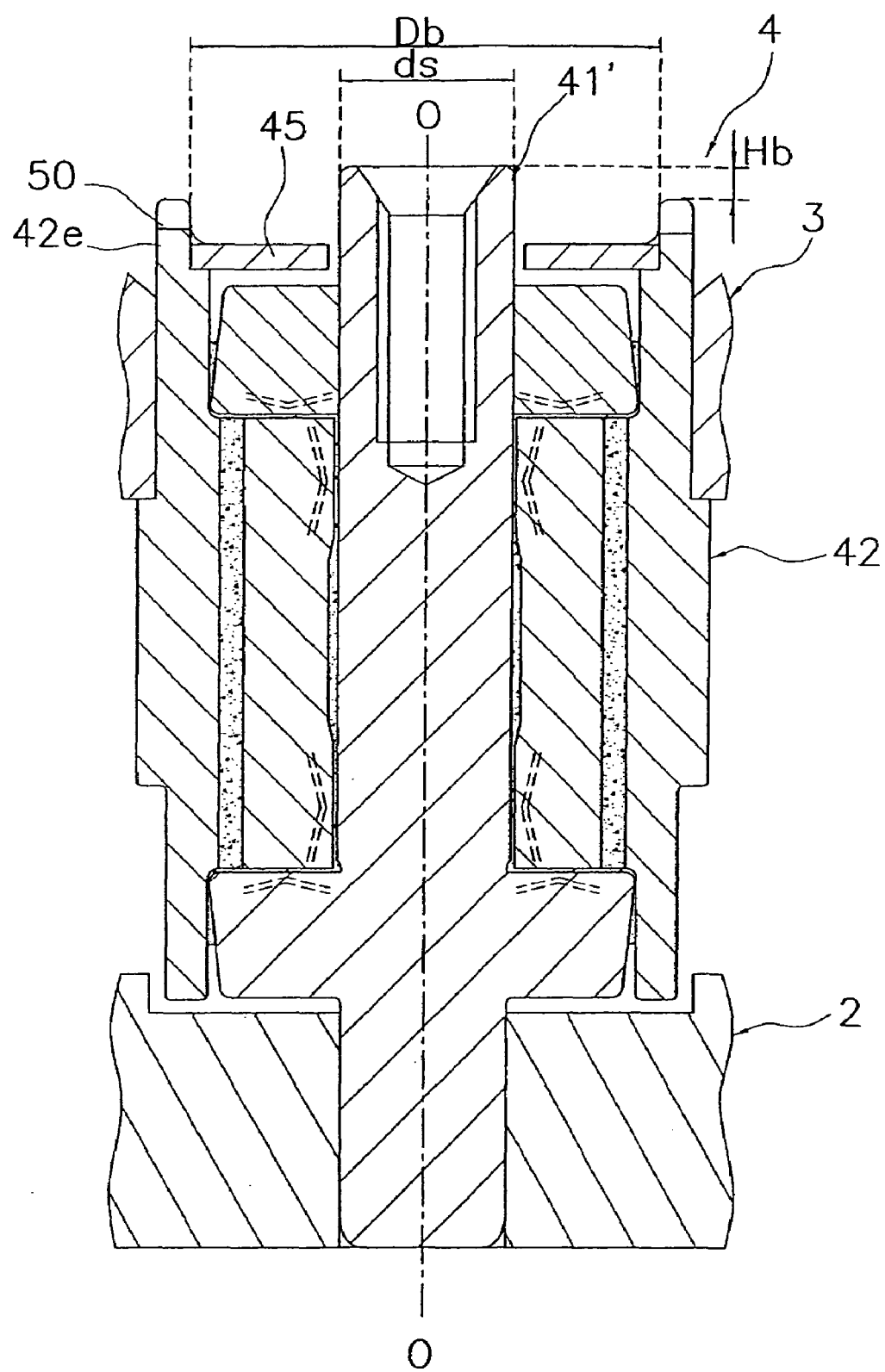
FIG. 7 is a cross section of a hydrodynamic bearing device in a modification.

For instance, as shown in FIG. 7, the effect of the present invention will be obtained if the distal end of a shaft 41' protrudes farther to the axial upper side than the distal end of the third cylindrical protrusion 42e. More specifically, the inside diameter Db of the third cylindrical protrusion 42e is 15 mm or less, the inside diameter Db is at least 2 times the diameter ds of the shaft 41', and the amount of protrusion Hb of the distal end of the shaft 41' beyond the distal end of the third cylindrical protrusion 42e is no more than one-third the inside diameter Db. In this case, it is possible that the entire upper side of the third cylindrical protrusion 42e will be blocked off with a finger, but the inside of the bearing will not be pressurized by the lubricant 46 because of the action of the communication mechanisms discussed in the above embodiment and modifications.

(6-5)

In the above embodiment, it was described that the communication mechanism was formed in the third cylindrical protrusion 42e, which is part of the sleeve 42, but the communication mechanism may be formed in any other part of the spindle motor 1.

Figure 8:
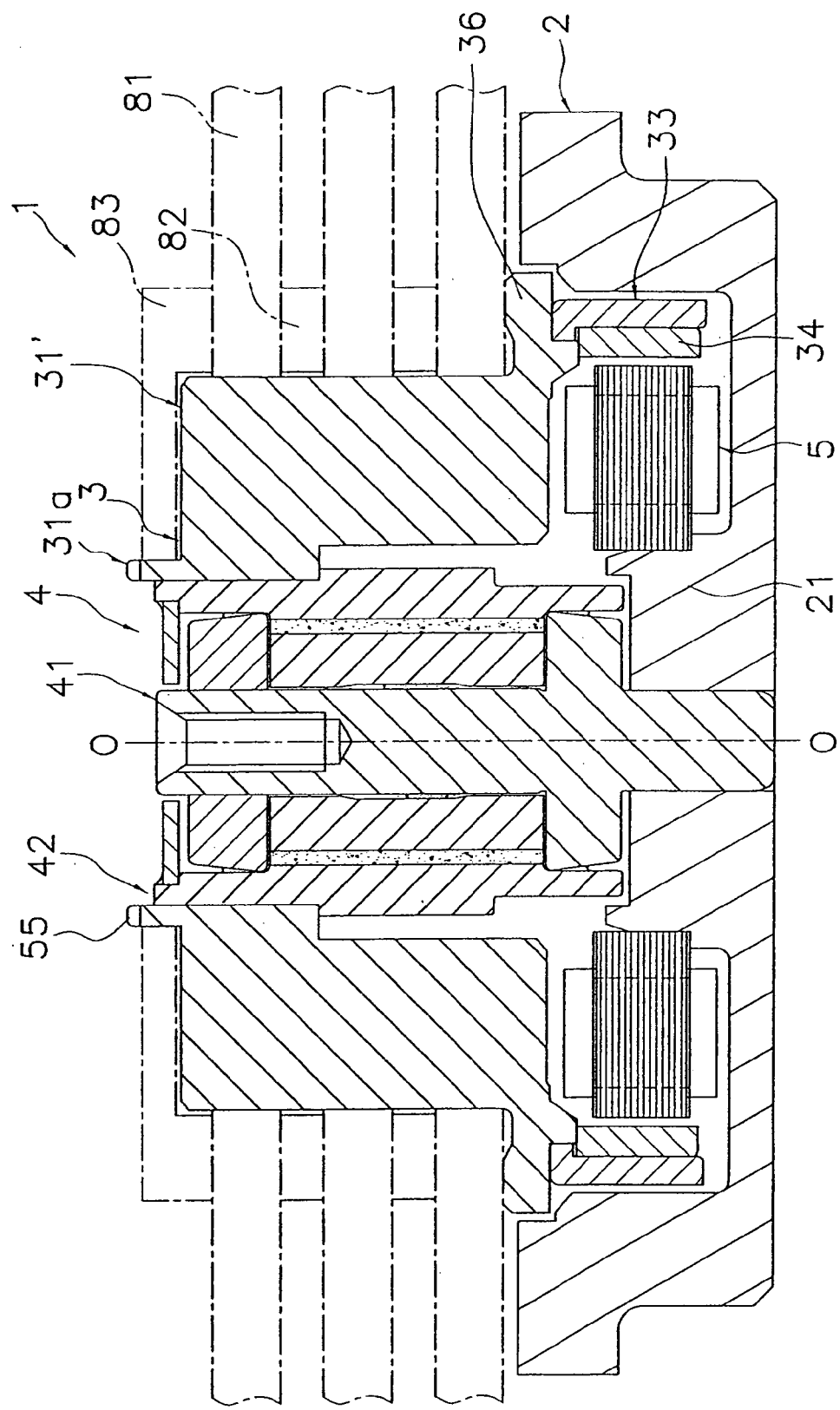
FIG. 8 is a cross section of a spindle motor in a modification.

For instance, as shown in FIG. 8, when a rotor hub 31' fixed to the outer peripheral side of the sleeve 42 is equipped with an annular protrusion 31a that extends upward in the axial direction, the communication mechanism (such as a notch 55) may be formed in the protrusion 31a. The notch 55 is formed so as to communicate between the radial inner space and radial outer space of the protrusion 31a.

Figure 9:
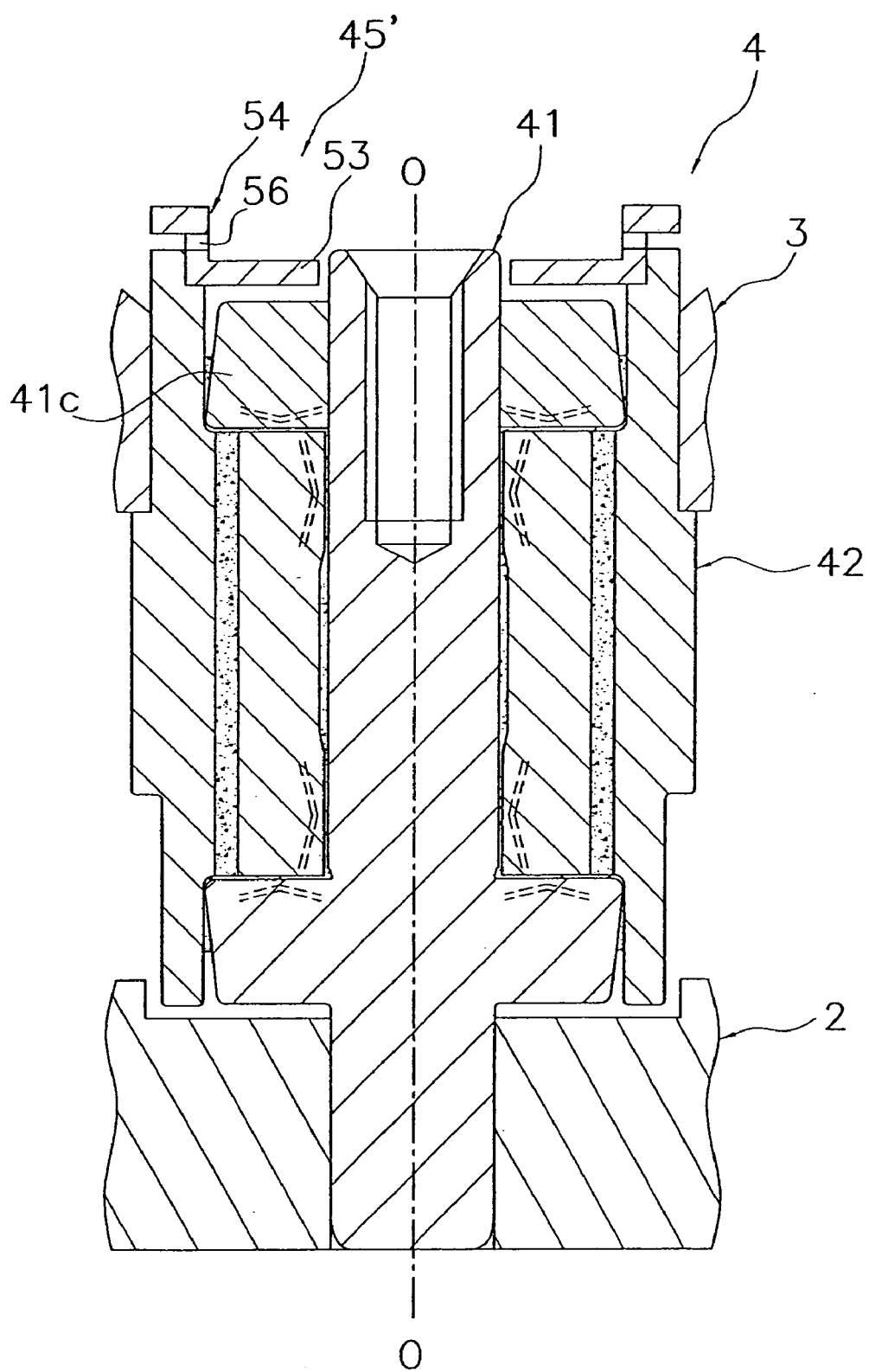
FIG. 9 is a cross section of a hydrodynamic bearing device in a modification.

Furthermore, as shown in FIG. 9, the communication mechanism (such as a communication hole 56) may be formed in the cover. In this case, a cover 45' is primarily constituted by an annular portion 53 fixed and disposed on the inner peripheral side of the third cylindrical protrusion 42e, and a cylindrical portion 54 that extends upward in the axial direction from the outer peripheral edge of the annular portion 53. Here, the annular portion 53 is fixed by adhesive bonding, press-fitting, welding, or the like on the inner peripheral side of the third cylindrical protrusion 42e. A communication hole 56 for communicating between the radial inner space and radial outer space separated by the cylindrical portion 54 is formed in the cylindrical portion 54. Further, this cover 45' may be fixed to the rotor hub 31 (see FIG. 1) rather than to the sleeve 42.

With the structures shown in FIGS. 8 and 9 above, the action of the communication mechanism ensures that the inside of the bearing will not be pressurized by the lubricant 46. In particularly, when the communication mechanism is provided to the cover 45' as shown in FIG. 9, there is no need to machine the communication mechanism directly in the sleeve 42 or rotor hub 31, so there is none of the loss of precision that would otherwise be caused by machining the communication mechanism. Also, if the cover 45' is made from plastic or sheet metal, this reduces the cost of manufacturing either the hydrodynamic bearing device 4 or a spindle motor 1 equipped with the hydrodynamic bearing device 4.

The constitution of the communication mechanism needs not be that discussed here, and may be any of those discussed above.

(6-6)

The corners of the faces that make up the communication mechanisms discussed in the above embodiment and modifications may be chamfered. This chamfering will prevent the occurrence of burrs during the precision machining of the sleeve 42, and will prevent such burrs from getting into the bearing and causing seizure, for example.

Before describing the specific chamfering process, let us first describe the manufacturing procedure for the hydrodynamic bearing device 4.

1) Primary blank machining of the sleeve 42 (or rotor hub 31): In the primary machining, a lathe is used to turn a blank down to the sleeve 42 (or rotor hub 31).

2) Secondary blank machining: The communication mechanism (notch, communication hole, etc.) is machined in the blank that has undergone primary machining. For example, the notches 50 are formed in the sleeve 42 (see FIG. 2). The notches 50 here are formed with a forming tool, or by pressing, forging, electric discharge machining, or the like. In the case of machining such as this, chamfering (beveling or rounding) is performed simultaneously with the machining. When a communication hole is formed in the sleeve 42, drilling or electric discharge machining is performed in this secondary machining to form the communication hole. In addition to the secondary machining, third-, fourth-, fifth- and higher-order machining may also be performed.

Figure 15:
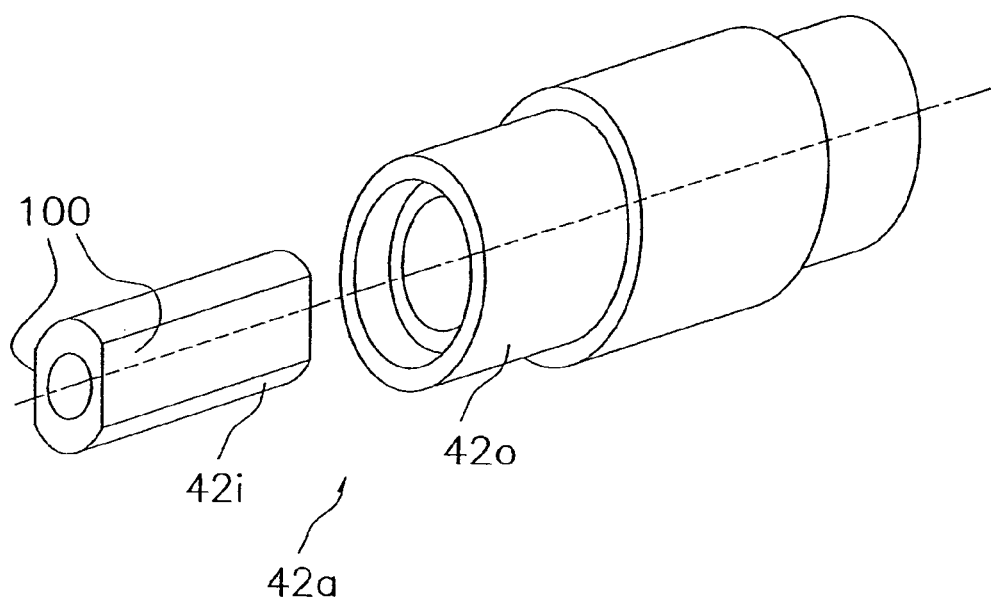
FIG. 15 is an oblique view of the structure of an inner sleeve and an outer sleeve.

3) Press-fitting inner and outer sleeves: To form the thrust vertical communication holes 42f, in this embodiment, the sleeve main component 42a may be divided into two members, an inner sleeve 42i and outer sleeve 42o as shown in FIG. 15, and the outer periphery of the inner sleeve may be provided with D-cuts 100, or with a plurality of vertical grooves (not shown). The inner sleeve 42i produced in this manner is press-fitted and fixed on the inner peripheral side of the outer sleeve 42o.

When the thrust vertical communication holes 42f are made by drilling or other such machining, the sleeve main component 42a does not necessarily have to be divided in two, and this step can be skipped.

4) Precision machining: Here, prior to machining the dynamic pressure generation grooves (discussed below), precision machining is performed on portions that mate with or come into contact with the rotor hub 31, bearing gaps that will be filled with the lubricant 46, bearing seals, and so forth. The precision machining of portions around the communication mechanism is not necessarily required, and the blank machined faces may be left as they are.

5) Dynamic pressure generation groove machining: The first dynamic pressure generation grooves 71a and 71b are formed by forging or electrolytic machining on the inner peripheral face of the sleeve 42 that has undergone precision machining.

6) Bearing assembly: The sleeve 42 in which the dynamic pressure generation grooves have been formed, the shaft 41 manufactured in a separate step, and so forth are assembled, and the lubricant 46 is introduced.

Figure 10:
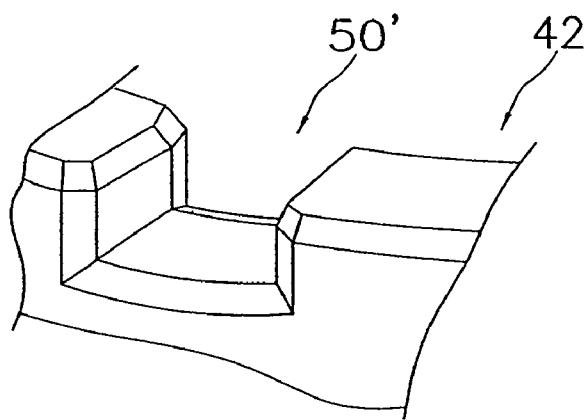
FIG. 10 is an oblique view of a communication mechanism in a modification.

During the formation of the communication mechanism discussed in step 2 above, the corners of the faces constituting the communication mechanism are chamfered. This will be described through reference to FIG. 10. FIG. 10 shows a notch 50' produced by chamfering (beveling) all of the corners of the faces that make up the notch 50. This chamfering is performed simultaneously in the formation of the notch 50 using a forming tool on a material in the form of a blank. Therefore, the machining can be completed in a short time, at low cost, and with good precision. The chamfering is not limited to beveling, and may instead be rounding.

If the precision machining of step 4 is performed after this chamfering, the occurrence of burrs will be kept to an insignificant level.

The communication mechanism is not limited to a notch, and also with a communication hole, the occurrence of burrs can be reduced by similarly performing chamfering on the opening of the communication hole.

(6-7)

The occurrence of burrs may also be reduced by modifying the cross sectional shape of the communication mechanism. This will be described through reference to FIGS. 11 and 12.

Figure 11A:
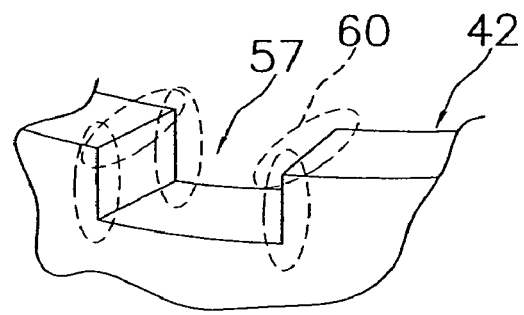
FIG. 11 is an oblique view of a communication mechanism in a modification.

For instance, as shown in FIG. 11a, when a notch 57 with a rectangular cross sectional shape is formed as the communication mechanism, burrs tend to occur at the corners 60 enclosed by dotted lines in the drawing, during the machining of the notch 57 and during precision machining (step 4 in 6-6).

Figure 11B:
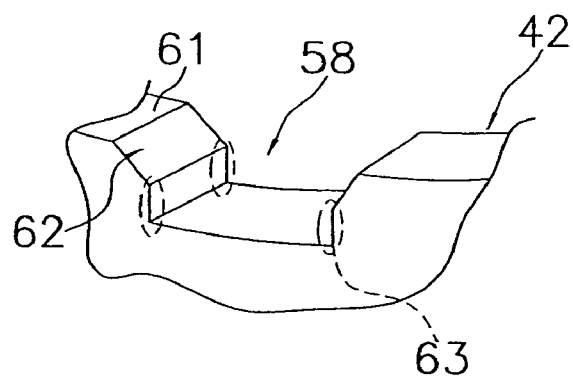

Chamfering just the corners 62 of the top face 61 (in the axial direction) as shown in FIG. 11b does not satisfactorily suppress the occurrence of burrs if there are corners 63 that extend in the axial direction.

Figure 11C:
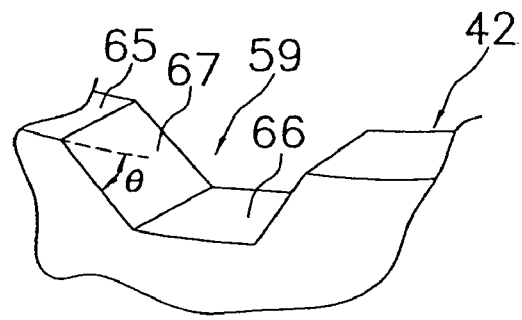

On the other hand, the occurrence of burrs will be satisfactorily suppressed if the cross sectional shape is as shown in FIG. 11c, in which there are no corners that extend in the axial direction.

In FIG. 11c, the cross sectional shape is trapezoidal, and a slanted face 67 that is slanted in the peripheral direction links the top face 65 (in the axial direction) to the bottom 66 of the notch 59. This slanting reduces the occurrence of burrs during lathe turning, for example. The angle θ between the slanted face 67 and the axial direction top face 65 is 60 degrees or less, and preferably 45 degrees or less, and even more preferably 30 degrees or less.

When the notch is formed by a slanted face having an angle such as this, the cross sectional shape may be triangular, so that there is no bottom 66. In this case, the cross sectional shape is preferably that of a triangle having an obtuse angle on the axial lower side.

Furthermore, to reduce the occurrence of burrs during lathe turning, the cross sectional shape of the notch does not have to be in left and right symmetry when viewed from the direction in which the notch is formed. This will be described through reference to FIG. 12.

Figure 12A:
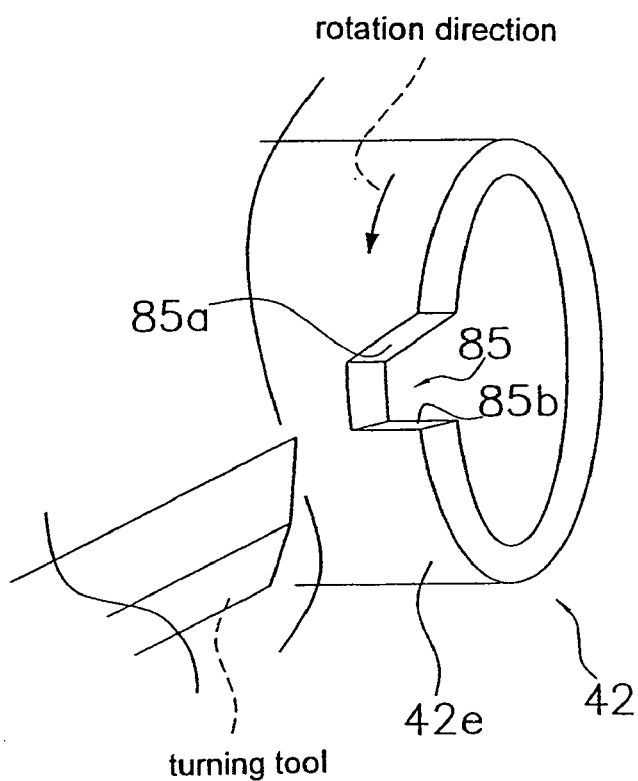
FIG. 12 is a diagram illustrating the effect of the communication mechanism in a modification.

The notch 85 shown in FIG. 12a has a slanted face 85a, which slants at an angle of no more than 60 degrees, and preferably no more than 45 degrees, and even more preferably no more than 30 degrees, with respect to the axial top face 86, and which is provided to the rear (in the rotation direction) of the workpiece during lathe turning (the side where the turning tool is applied during lathe turning), and has a side face 85b that extends in the axial direction at the front in the rotation direction (the side on which the turning tool leaves during lathe turning).

Figure 12B:
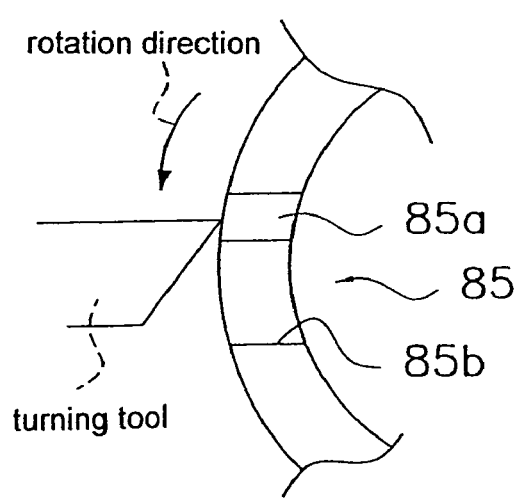

In this case, as shown in FIG. 12b, there is less vibration and chatter in intermittent cutting during lathe turning with the turning tool applied to the workpiece, and fewer burrs occur.

(6-8)

In recent years, when a HDD malfunctions for one reason or another, it is sent to a technician, the malfunctioning HDD is taken apart in a cleanroom, the recording disks are taken out, the drive is replaced with one of the same model, and data is read or backed up, or magnetic developing is performed to read out the information in bit units, for example.

When this method is employed, however, it can be difficult to reproduce the information recorded on the recording disks if the recording disks have been soiled by the lubricant inside the bearing. It is therefore necessary to prevent the lubricant from scattering onto the recording disks.

Figure 13A:
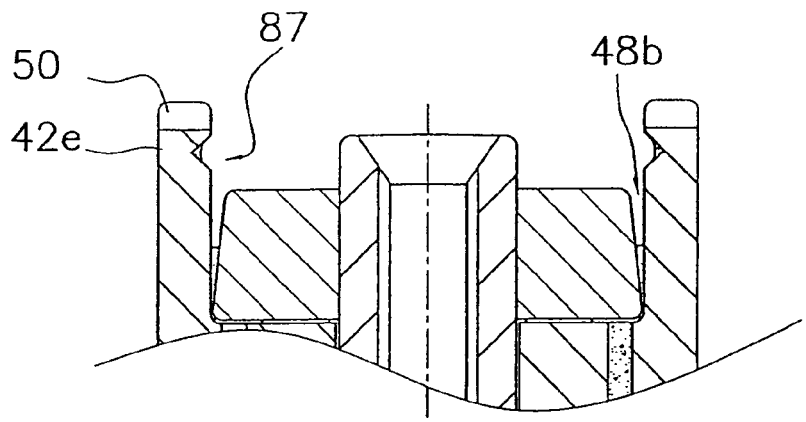
FIG. 13 is a cross section of a hydrodynamic bearing device in a modification.

In view of this, as shown in FIG. 13, a recess 87 that is annular in the peripheral direction is provided to the inner peripheral face of the third cylindrical protrusion 42e. The recess 87 is a radial recess whose cross sectional shape including the axis is triangular. The recess 87 is provided more to the axial lower side than the notch 50 formed at the distal end (in the axial direction) of the third cylindrical protrusion 42e.

With the above constitution, even if the lubricant 46 should move upward in the axial direction from the taper seal 48b, the recess 87 will be able to contain the lubricant 46. Accordingly, it is possible to prevent the lubricant 46 from scattering outward in the radial direction beyond the third cylindrical protrusion 42e or the notch 50. Therefore, if the HDD should malfunction for some reason, even in a worst case scenario the information recorded on the recording disks 81 can still be read.

Figure 13B:
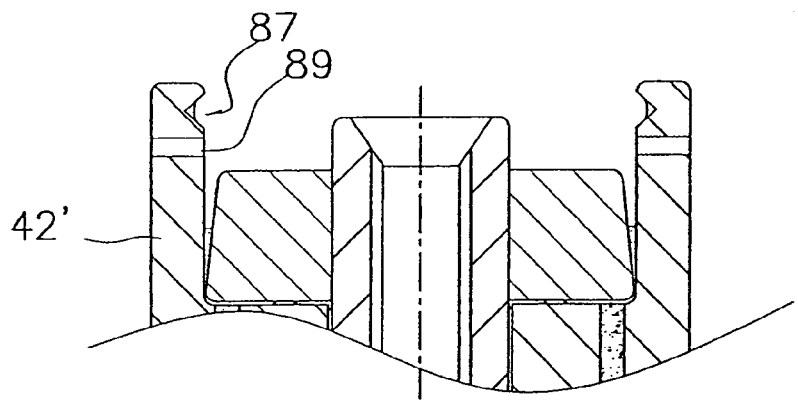

A case in which the notch 50 was formed at the distal end of the third cylindrical protrusion 42e was described above, but the constitution of the communication mechanism is not limited to the notch 50, and another constitution may be used instead. For instance, as shown in FIG. 13b, the communication mechanism may be a communication hole 89 that extends in the radial direction and is formed at the distal end of the sleeve 42'.

The direction in which the communication mechanism is formed is not limited to the radial direction, and may instead be the peripheral direction with respect to the radial direction, or a direction that is at an angle to the axial direction.

Figure 13C:
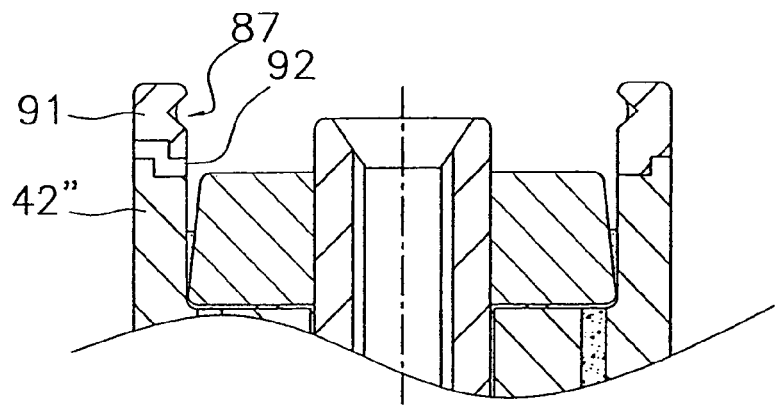

Also, the recess 87 does not have to be machined directly in the third cylindrical protrusion 42e. For instance, as shown in FIG. 13c, a cylindrical member 91 having the recess 87 machined in its inner peripheral face may be fixed to the top end (in the axial direction) of a sleeve 42". Here, the communication mechanism may be formed at the distal end of the cylindrical member 91, or, as shown in FIG. 13c, a notch 92 may be formed in the bottom end (in the axial direction) of the cylindrical member 91, and this notch 92 placed across from the top face (in the axial direction) of the sleeve 42", thereby forming the communication mechanism (communication hole).

The cover 45 (see FIG. 2) is not shown in FIG. 13, but may be disposed as needed in addition to the machining of the recess 87.

(6-9)

In the above embodiment, a constitution in which the hydrodynamic bearing device 4 was equipped with a notch 50 as the communication mechanism was described. This communication mechanism may be provided to a jig that is in place only when there is the possibility that the lubricant inside the bearing could be accidentally pressurized by a worker.

The phrase "when there is the possibility that the lubricant inside the bearing could be accidentally pressurized by a worker" here refers, for example, to during inspection in the assembly process of a hydrodynamic bearing device, the process of installing a hydrodynamic bearing device in a motor, the process of installing a motor in a HDD, and so forth, and to during placement on pallets, during shipping, and so on. The jig here will be described through reference to FIG. 14.

Figure 14:
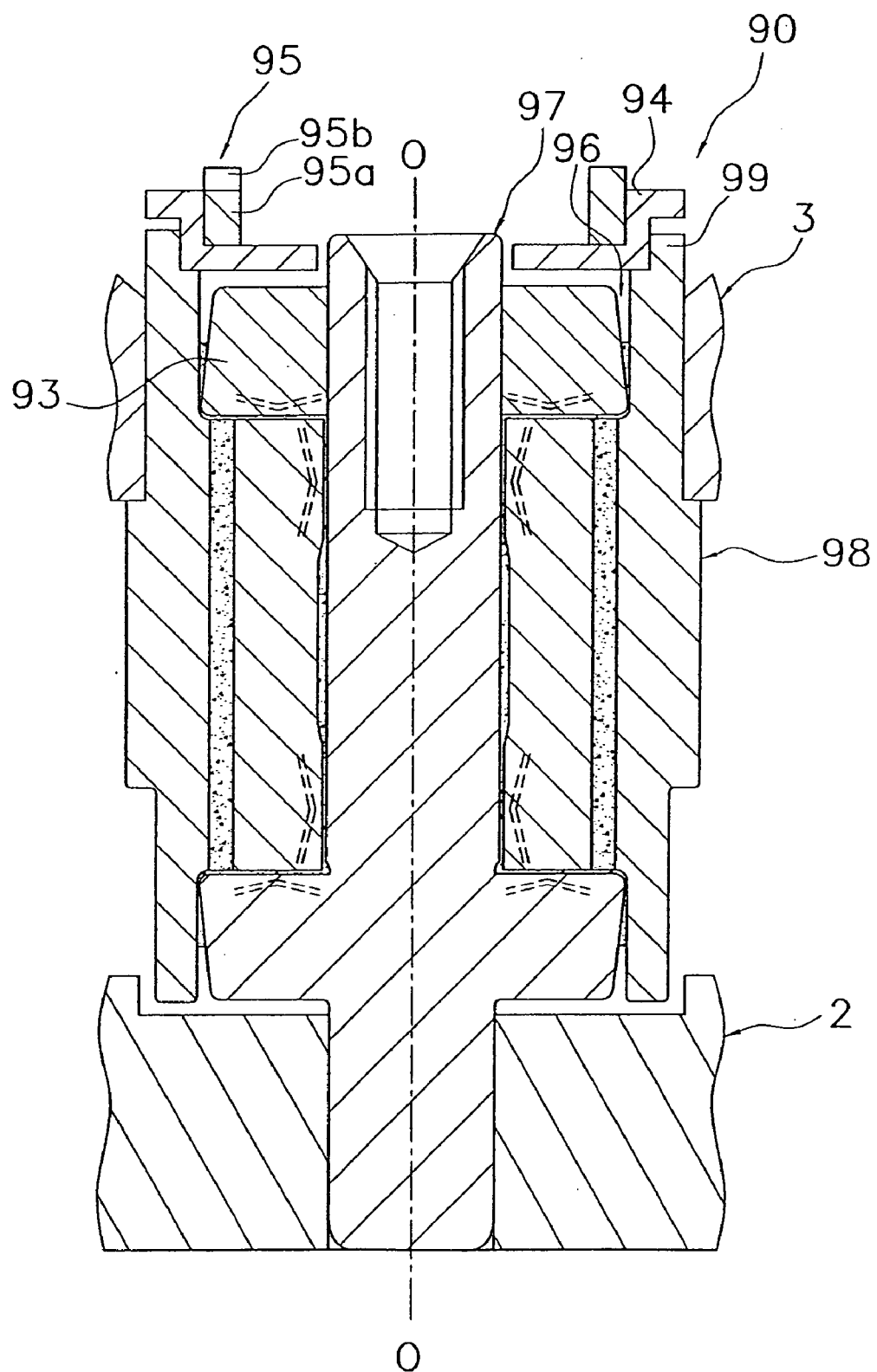
FIG. 14 is a cross section of a hydrodynamic bearing device in a modification.

FIG. 14 shows a jig 95 used in the process of assembling a conventional hydrodynamic bearing device 90.

With the hydrodynamic bearing device 90 shown in FIG. 14, a ring-shaped cover 94 is fixed to the distal end of a third cylindrical protrusion 99 of a sleeve 98 so as to cover a thrust flange 93 from the top in the axial direction. The cover 94 is primarily constituted by a ring-shaped portion that is fitted and fixed on the inside of the third cylindrical protrusion 99, and a cylindrical portion that rises upward in the axial direction from the outer edge of the ring-shaped portion. The cover 94, at least the ring-shaped portion or cylindrical portion, is made of a soft magnetic material, for example.

The jig 95 is a member that is placed on the hydrodynamic bearing device 90, and is primarily constituted by an annular portion 95a having a side face that extends in the axial direction, and a communication mechanism 95b formed in the annular portion 95a.

The annular portion 95a is an annular member having an inside diameter that is smaller than the inside diameter of the cylindrical portion of the cover 94, and is constituted by a magnet. The communication mechanism 95b is a notch in the radial direction, for communicating between the inside and outside in the radial direction of the annular portion 95a.

The above-mentioned jig 95 is used as described below. The following process may be carried out "when there is the possibility that the lubricant inside the bearing could be accidentally pressurized by a worker" as discussed above.

1) Mounting of the jig 95: The jig 95 is mounted to the cover 94 of the hydrodynamic bearing device 90. The jig 95 here is mounted by mating the annular portion 95a to the inside of the cylindrical portion of the cover 94. The annular portion 95a is kept in a mounted state by its magnetic force, which chucks it to the ring-shaped portion or cylindrical portion of the cover 94.

2) Assembly process: This entails the assembly of the hydrodynamic bearing device 90, the installation of the hydrodynamic bearing device 90 in a spindle motor, the installation of a spindle motor to a HDD, or the like.

3) Removal of the jig 95: The jig 95 is removed from the cover 94.

In a state in which the jig 95 is placed on the cover 94, the radial inner space of the jig 95 communicates with a taper seal 96 where the interface of the hydrodynamic bearing device 90 is located. Furthermore, the radial inner space of the jig 95 communicates with the radial outer space through the communication mechanism 95b. Therefore, during the work in step 2, even if a worker should inadvertently block of the annular portion 95a with a finger, causing the radial inner space of the jig 95 to be pressurized, this pressure can escape to the radial outer space. This prevents the pressure from being transmitted to the interface of the taper seal 96.

The hydrodynamic bearing device to which the jig 95 is applied is not limited to the hydrodynamic bearing device 90 shown in FIG. 14, and may be another hydrodynamic bearing device.

Nor is the constitution of the jig 95 limited to that discussed above. For instance, the jig 95 may be made of acrylic, polycarbonate, glass, or another transparent material, and fixed to the cover 94 by using elastic force of the like. This makes it possible to perform the work while monitoring the situation inside the jig 95.

Nor is the mounting of the jig 95 to the hydrodynamic bearing device 90 limited to what is discussed above. For instance, the mounting may be accomplished by forming male threads around the outer periphery of the jig 95, and forming female threads corresponding to these male threads around the inner periphery of the cylindrical portion of the cover 94.

Also, the jig 95 may be fixed to a shaft 97. In this case, a jig comprising a magnet and having an inside diameter corresponding to the outside diameter of the shaft, for example, may be mounted to a shaft 97 made of SUS 420 or the like. Another possible structure is one in which a jig is mounted in a threaded hole for attaching the HDD cover, located at the distal end of the shaft 97.

The jig 95 may also have another structure, such as one involving attachment to the hydrodynamic bearing device 90 by a spring clamping structure.

(6-10)

The constitution described in the above embodiment and modifications can also be applied to other bearing structures. For instance, in FIG. 2, the hydrodynamic bearing device 4 need not be provided with the cover 45. Furthermore, the hydrodynamic bearing device 4 need not have a full-fill structure, and may have a partial-fill structure in which there are voids along the way.

Moreover, the applications of the spindle motor 1 equipped with the hydrodynamic bearing device 4 are not limited to a HDD, and this motor can also be applied to an optical disk apparatus, polygon mirror driving apparatus, or the like.

Second Embodiment

Figure 16:
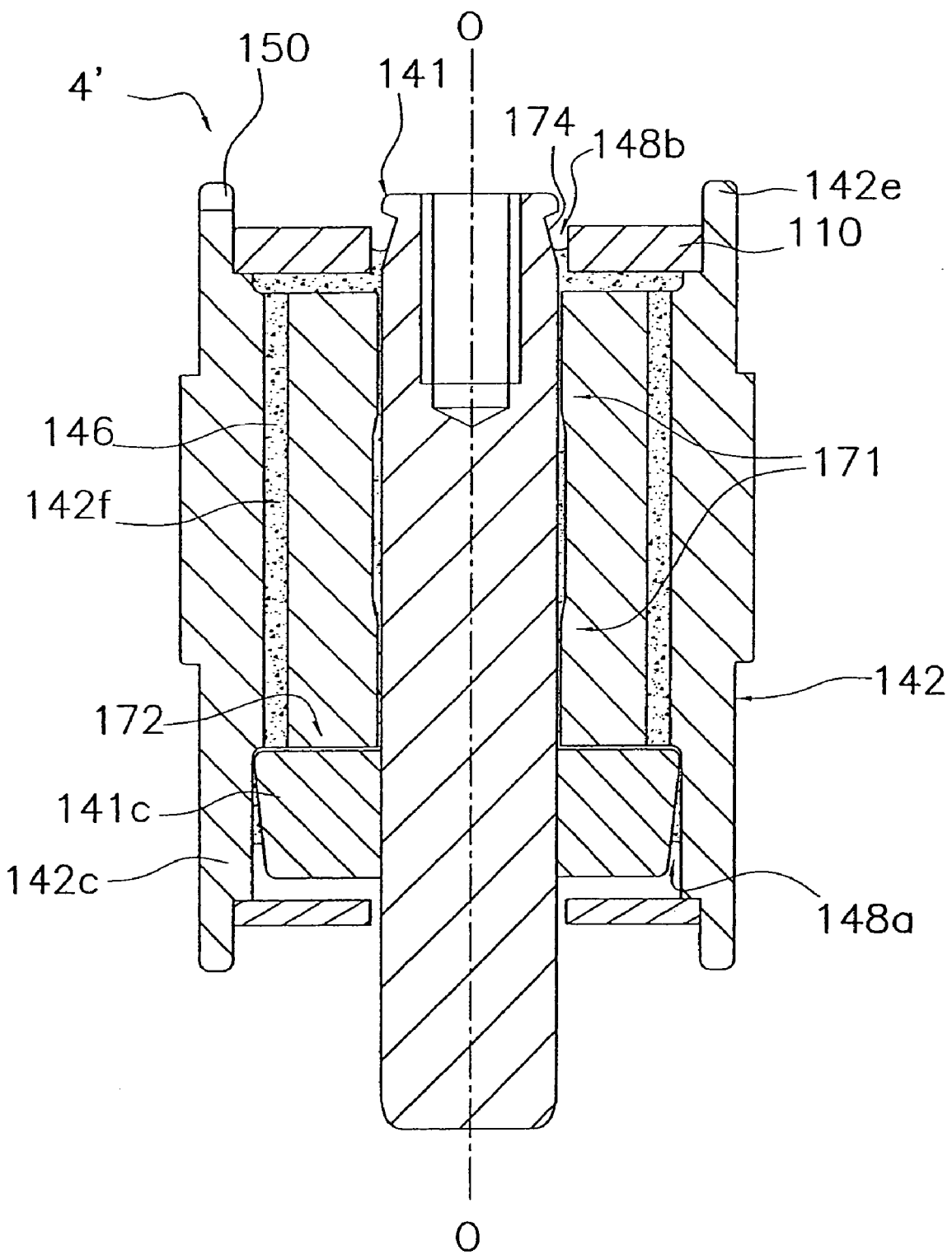
FIG. 16 is a cross section of a hydrodynamic bearing device in a second embodiment of the present invention.

The hydrodynamic bearing device in a second embodiment of the present invention will now be described through reference to FIG. 16. Those portions that are the same as in the first embodiment above will not be described again. FIG. 16 is a simplified vertical cross section of a hydrodynamic bearing device 4' as a second embodiment of the present invention. The hydrodynamic bearing device 4' has a rotor (not shown) rotatably supported by a base plate (not shown), and has a sleeve 142 and a shaft 141.

The sleeve 142 is a member on the rotating side of the hydrodynamic bearing device 4', and is a cylindrical member disposed so as to be capable of relative rotation with respect to the shaft 141 discussed below. A radial bearing 171 is constituted between the inner peripheral cylindrical face of the sleeve 142 and the outer peripheral face of the shaft 141. Below the sleeve 142, a thrust bearing 172 is constituted across from a thrust flange 141c fixed or integrally machined at the bottom end side of the shaft 141.

A first cylindrical protrusion 142c is provided via a radial gap on the outer peripheral side of the thrust flange 141c. The outer peripheral side of this thrust flange 141c is a conical surface having an angle of inclination of several degrees, and constitutes a taper seal 148a whose gap spreads out toward the outside of the bearing between this conical outer peripheral face and the first cylindrical protrusion 142c.

A top seal 110 is fastened above the sleeve 142. A taper face 174 having an angle of inclination of several degrees toward the outside of the bearing is formed around the outer periphery of the shaft 141 at a location across from the inner peripheral cylindrical face of this top seal 110, and a taper seal 148b whose gap spreads out toward the outside of the bearing is constituted between this tapered outer peripheral face and the top seal 110.

Thrust vertical communication holes 142f are provided in order to equalize the pressure between the outer peripheral side of the thrust bearing 172 and the top side of the radial bearing 171.

A lubricant 146 fills the radial bearing 171, the thrust bearing 172, and the thrust vertical communication holes 142f, and also fills the taper seals 148a and 148b about halfway, without any voids.

A notch 150 is formed in at least one place in the peripheral direction at the top end (in the axial direction) of a second cylindrical protrusion 142e. The notch 150 serves as a communication mechanism for communicating between the radial inner space and radial outer space separated by the second cylindrical protrusion 142e.

The effect and operation in this embodiment are substantially the same as in the first embodiment; even if the second cylindrical protrusion 142e should be blocked off by a finger or the like, resulting in the pressurization of the inner space, that pressure will not be transmitted to the lubricant 146 through the taper seal 148b that communicates with the inner space. Thus, it is possible to prevent the lubricant 146 from leaking out from the taper seal 148a on the axial lower side, which communicates with the taper seal 148b through the lubricant 146, and to prevent the interface position of the taper seal 148b from being pushed down to the top end of the radial bearing 171 so that air bubbles get into the radial bearing 171.

Third Embodiment

Figure 17:
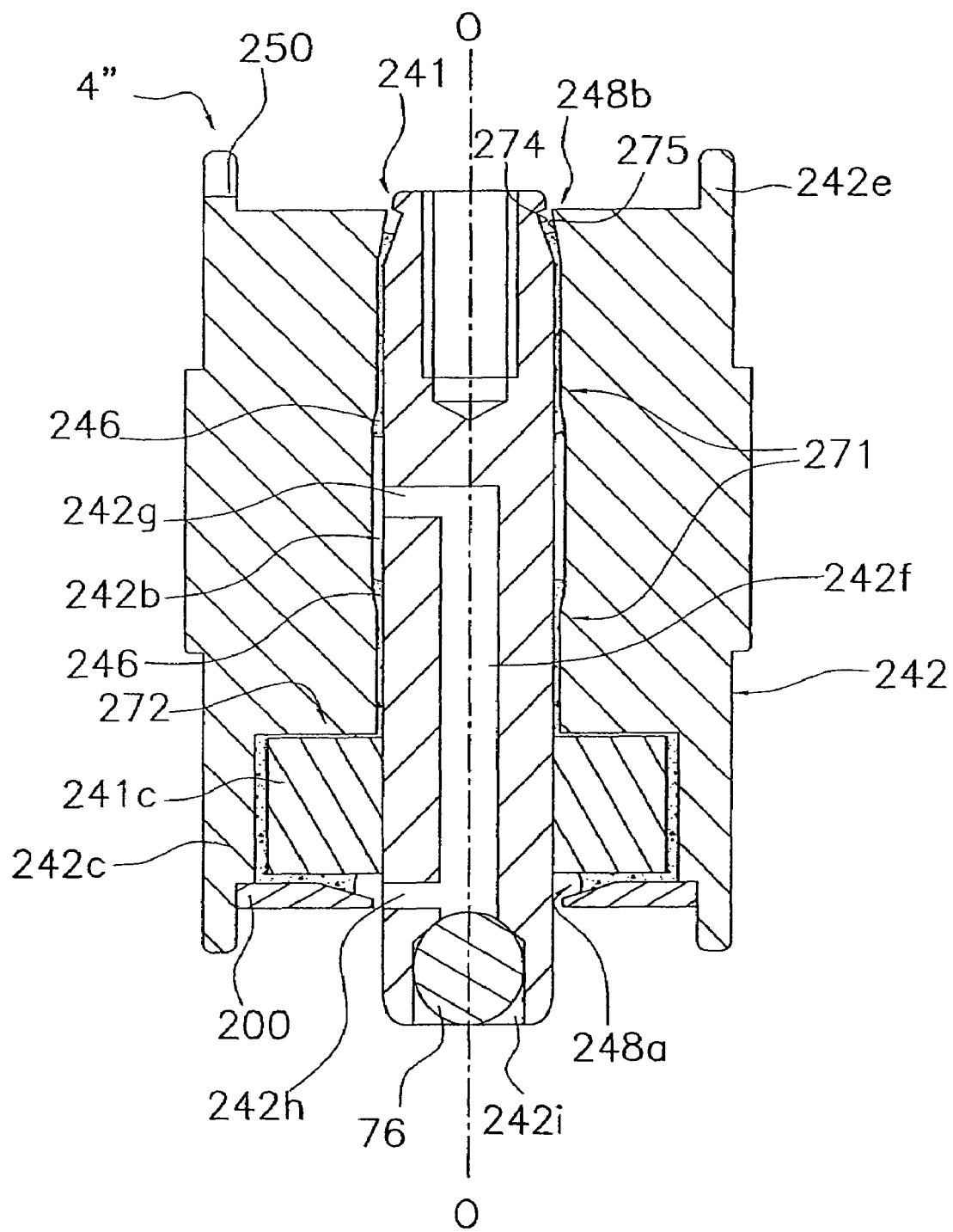
FIG. 17 is a cross section of a hydrodynamic bearing device in a third embodiment of the present invention.
Figure 18:
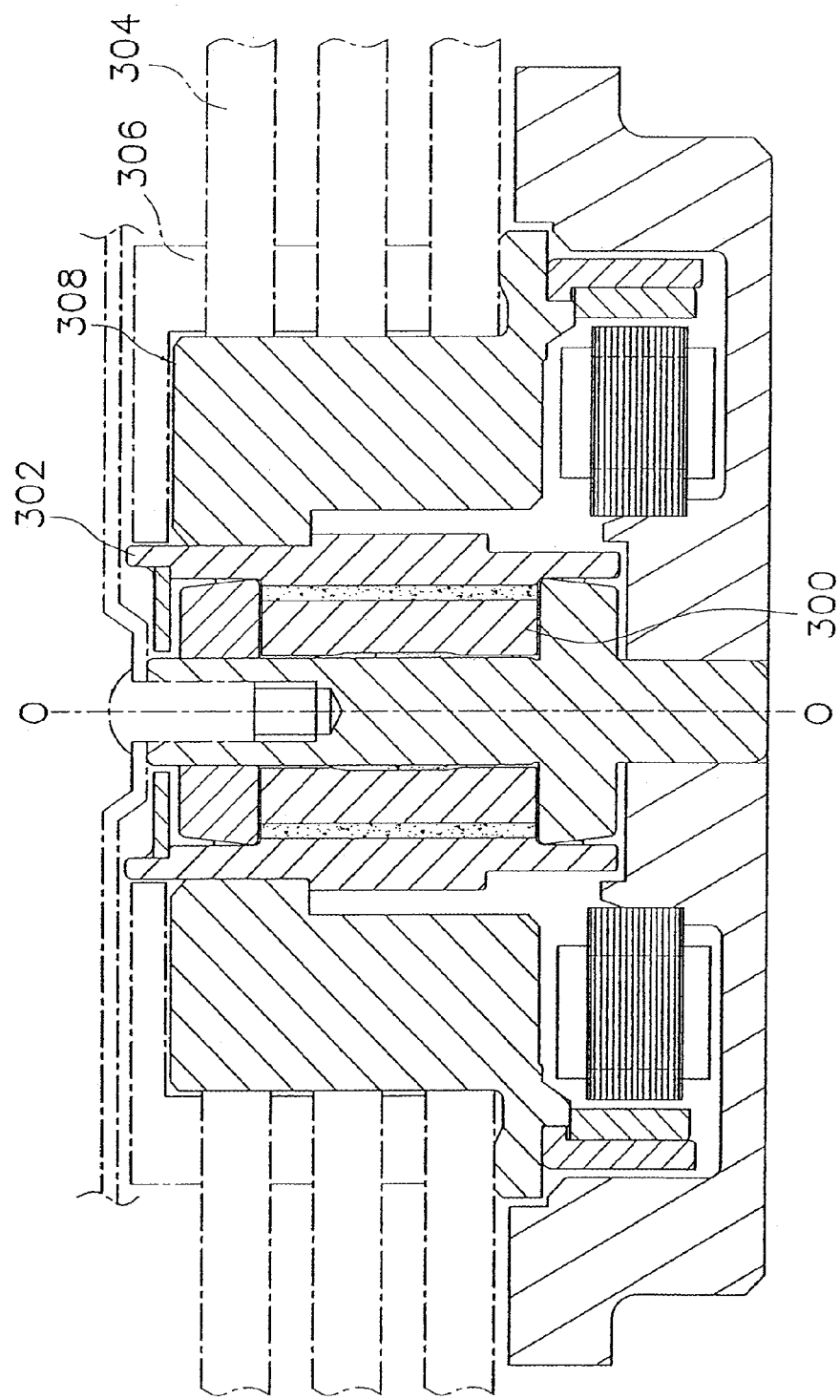
FIG. 18 is a cross section of a spindle motor in prior art.
Figure 19:
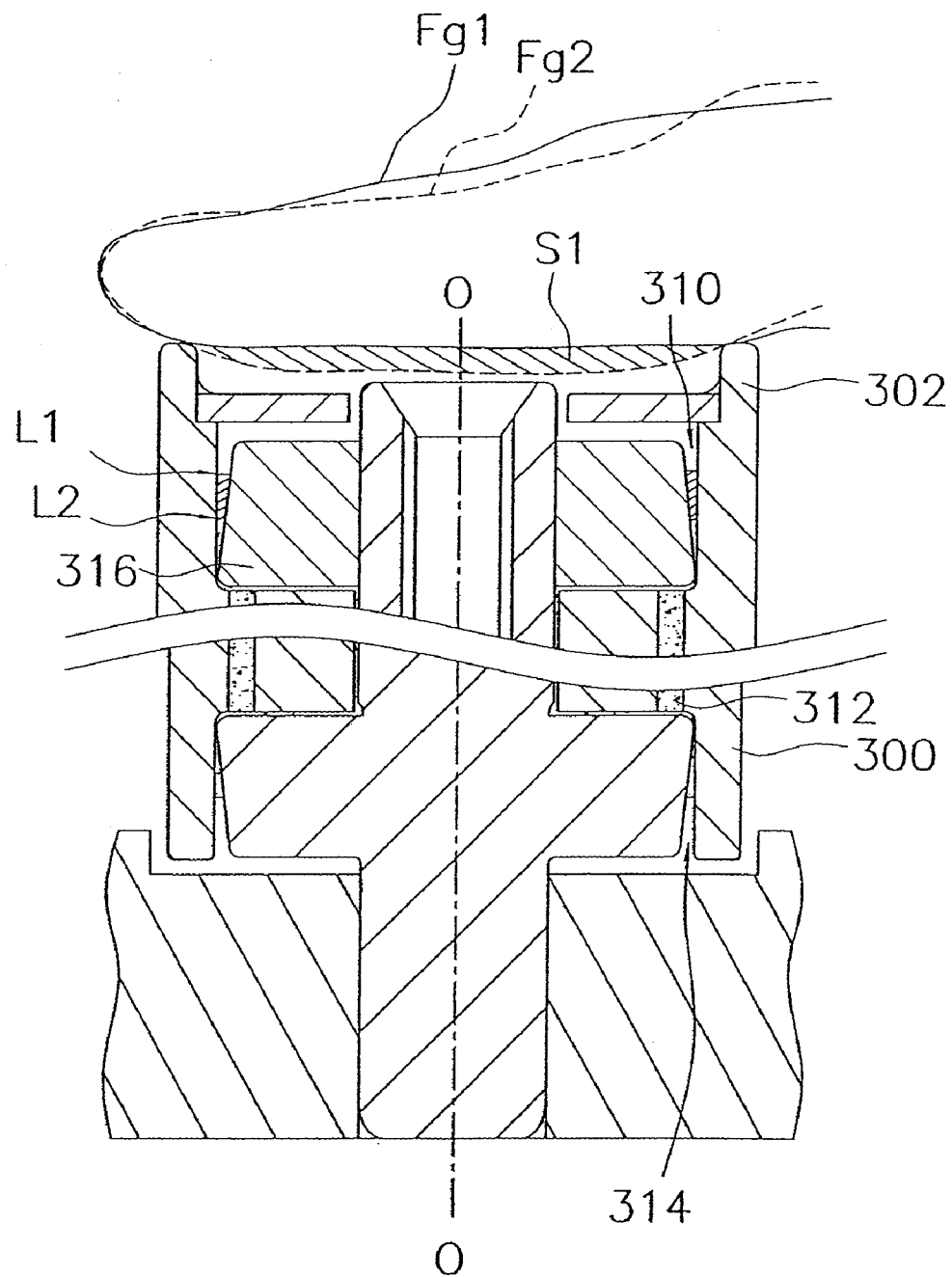
FIG. 19 is a diagram illustrating the problems encountered with prior art.

The hydrodynamic bearing device in a third embodiment of the present invention will now be described through reference to FIG. 17. Those portions that are the same as in the first embodiment above will not be described again. FIG. 17 is a simplified vertical cross section of a hydrodynamic bearing device 4" as a third embodiment of the present invention. The hydrodynamic bearing device 4" has a rotor (not shown) rotatably supported by a base plate (not shown), and has a sleeve 242 and a shaft 241.

The sleeve 242 is a member on the rotating side of the hydrodynamic bearing device 4", and is a cylindrical member disposed so as to be capable of relative rotation with respect to the shaft 241 discussed below. A radial bearing 271 is constituted between the inner peripheral cylindrical face of the sleeve 242 and the outer peripheral face of the shaft 241. Below the sleeve 242, a thrust bearing 272 is constituted across from a thrust flange 241c fixed or integrally machined at the bottom end side of the shaft 241.

A first cylindrical protrusion 242c is provided via a radial gap on the bottom end side of the thrust flange 241c. Further, a lower cover 200 having a tapered face with an angle of inclination of several degrees is provided via a radial gap on the upper face of the inner periphery under the first cylindrical protrusion 242c. A taper seal 248a is constituted here between the lower cover 200 and the bottom end side of the thrust flange 241c.

A tapered face 275 whose diameter decreases upward is formed above the sleeve 242. Meanwhile, a tapered face 274 whose diameter decreases upward is formed near the top end (in the axial direction) of the shaft 241. The radial gap between the tapered faces 274 and 275 constitutes a taper seal 248b, with the angle of inclination thereof set so as to widen upward in the axial direction.

Further, a recess 242b is provided between the bottom end side and top end side of the radial bearing 271. Here, the lubricant 246 fills the space between the taper seal 248b and the upper radial bearing 271, and also fills the space from the lower radial bearing 271, through the thrust bearing 272, to the taper seal 248b. Specifically, the recess 242b is not filled with the lubricant 246.

Here, bearing communication holes 242f, 242g, and 242h are provided to the shaft 241 for the purpose of communicating between the recess 242b and the taper seal 248a so as to equalize the pressure of the recess 242b to atmospheric pressure. A spherical sealing member 76 for sealing a lower hole 242i provided as a door to the bearing communication holes 242f is bonded to the bottom end of the shaft 241.

A notch 250 is formed in at least one place in the peripheral direction at the top end (in the axial direction) of a second cylindrical protrusion 242e. The notch 250 serves as a communication mechanism for communicating between the radial inner space and radial outer space separated by the second cylindrical protrusion 242e.

The effect and operation in this embodiment are substantially the same as in the first embodiment; even if the second cylindrical protrusion 242e should be blocked off by a finger or the like, resulting in the pressurization of the inner space, that pressure will not be transmitted to the lubricant 246 through the taper seal 248b that communicates with the inner space. Thus, it is possible to prevent the interface of the lubricant 246 from dropping in the taper seal 248b and the lubricant 246 from overflowing into the recess 242b, and to prevent air bubbles from getting into the upper radial bearing 271.

Other

Examples of the present invention were given above through preferred embodiments of the present invention, but the present invention should not be construed as being limited to or by these embodiments. It will be understood that the scope of the present invention should be interpreted only by the claims. A person skilled in the art will understand from the descriptions in the specific preferred embodiments of the present invention that an equivalent scope can be worked on the basis of the descriptions and technical knowledge of the present invention. It will be understood that the contents of the patents, patent applications, and publications quoted in this specification are to be cited as reference for this specification, just as if the contents themselves were discussed in specific terms in this specification.

INDUSTRIAL APPLICABILITY

The present invention is useful in fields where it is necessary to prevent leakage of a lubricant filling a bearing, or the infiltration of air bubbles into the bearing, even if a worker should accidentally block off the open end of the bearing with a finger or the like in the course of assembling a hydrodynamic bearing device, or in the course of attaching this hydrodynamic bearing device to a motor, or in the course of attaching this motor to a HDD.

The invention claimed is:

1. A hydrodynamic bearing device, comprising:
a shaft;
a sleeve attached so as to be capable of relative rotation with respect to the shaft;
a bearing component including a lubricant that fills the space between the shaft and the sleeve, and a dynamic pressure generation groove that is formed around the outer peripheral face of the shaft or the inner peripheral face of the sleeve and that supports the sleeve rotatably with respect to the shaft;

a bearing seal that is constituted between the sleeve and the shaft, is provided near the two axial ends of the shaft, and seals the lubricant in the bearing component;

an annular protrusion that protrudes farther in the axial direction than the bearing seal, and that is fixed to or integrally machined on at least one end of the sleeve; and a communication mechanism having an opening extending between a radial outer surface and a radial inner surface of the annular protrusion, for communicating between the radial outer space and the radial inner space that are separated by the annular protrusion.

2. The hydrodynamic bearing device according to claim 1, wherein the sleeve is formed by a cylindrical portion having an inner peripheral face that is across from the outer peripheral face of the shaft, and the annular protrusion, which extends in the axial direction from said one end side of the cylindrical portion.

3. The hydrodynamic bearing device according to claim 1, wherein a hub, on which is formed a cylindrical portion having an inner peripheral face that is across from the outer peripheral face of the sleeve, and the annular protrusion, which extends in the axial direction from said one end side of the cylindrical portion, is substantially fixed to the outer peripheral side of the sleeve.

4. The hydrodynamic bearing device according to claim 1, wherein an annular member having the annular protrusion that extends in the axial direction from one end side of the sleeve is substantially fixed to said one end side of the sleeve.

5. The hydrodynamic bearing device according to claim 1, wherein the communication mechanism is formed in the radial direction.

6. The hydrodynamic bearing device according to claim 1, wherein the communication mechanism is formed so as to tilt radially outward to the side in the rotation direction of the sleeve.

7. The hydrodynamic bearing device according to claim 1, wherein the communication mechanism is a notch that is formed at the end of the annular protrusion and opens in the axial direction to said one end side.

8. The hydrodynamic bearing device according to claim 7, wherein the notch is at least 0.1 mm deep.

9. The hydrodynamic bearing device according to claim 7, wherein the notch is no more than 3 mm wide.

10. The hydrodynamic bearing device according to claim 7, wherein the depth Dg and width Wg of the notch satisfy $Wg/Dg \leqq 20$.

11. The hydrodynamic bearing device according to claim 7, wherein at least one of the corners of the faces that make up the notch is chamfered.

12. The hydrodynamic bearing device according to claim 7, wherein the notch is formed such that a cross section perpendicular to the radial direction is either rectangular, trapezoidal, or obtuse triangular in shape.

13. The hydrodynamic bearing device according to claim 1, wherein the communication mechanism is a communication hole formed on a side face near the end of the annular protrusion.

14. The hydrodynamic bearing device according to claim 13, wherein the diameter of the communication hole is at least 0.1 mm.

15. The hydro dynamic bearing device according to claim 13, wherein at least one of the corners of the faces that make up the communication hole is chamfered.

16. The hydrodynamic bearing device according to claim 1, wherein a concave portion that is annular in the peripheral direction is formed on the inner peripheral face of the annular protrusion.

17. The hydrodynamic bearing device according to claim 16, wherein the annular concave portion is formed on the other end side in the axial direction of the communication mechanism.

18. A motor, comprising:
the hydrodynamic bearing device according to claim 1;
a base to which the shaft is fixed;
a stator fixed to the base;
a rotor magnet that is disposed across from the stator and constitutes a magnetic circuit along with the stator; and
a hub to which the rotor magnet is fixed, and which is fixed to the sleeve.

19. A recording disk driving apparatus, comprising:
the motor according to claim 18;
a housing that is fixed to the base or integrally provided;
a disk-shaped recording medium that is fixed on the outer peripheral side of the hub and is capable of recording information; and
information access means for writing or reading information to or from the required locations on the recording medium.

* * * * *